[12] United States Patent
Joseph et al.

(10) Patent No.: US 11,206,114 B2
(45) Date of Patent: Dec. 21, 2021

(54) SOUNDING REFERENCE SIGNALS AND CHANNEL STATE INFORMATION REFERENCE SIGNALS ENHANCEMENTS FOR COORDINATED MULTIPOINT COMMUNICATIONS

(71) Applicant: QUALCOMM Incorporated, San Diego, CA (US)

(72) Inventors: Vinay Joseph, San Diego, CA (US); Mostafa Khoshnevisan, San Diego, CA (US); Farhad Meshkati, San Diego, CA (US); Piyush Gupta, Bridgewater, NJ (US); Alexandros Manolakos, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 16/447,670

(22) Filed: Jun. 20, 2019

(65) Prior Publication Data

US 2020/0014507 A1 Jan. 9, 2020

(30) Foreign Application Priority Data

Jul. 9, 2018 (GR) .............................. 20180100309

(51) Int. Cl.
*H04L 5/00* (2006.01)
*H04W 72/04* (2009.01)

(52) U.S. Cl.
CPC .......... *H04L 5/0035* (2013.01); *H04L 5/0048* (2013.01); *H04W 72/042* (2013.01); *H04W 72/0446* (2013.01)

(58) Field of Classification Search
CPC ... H04L 5/0035; H04L 5/0048; H04L 5/0053; H04L 5/14; H04L 5/005; H04L 5/0037;
(Continued)

(56) References Cited

U.S. PATENT DOCUMENTS

2018/0102817 A1* 4/2018 Park ..................... H04L 5/0057
2018/0115357 A1* 4/2018 Park ..................... H04B 7/0456
2018/0227094 A1* 8/2018 Liu ..................... H04W 72/046

OTHER PUBLICATIONS

Nokia et al. "UL SRS design considerations in NR," R1-1708928, May 19, 2017, 3GPP.*

(Continued)

*Primary Examiner* — Jae Y Lee
(74) *Attorney, Agent, or Firm* — Procopio, Cory, Hargreaves & Savitch LLP

(57) ABSTRACT

In an aspect of the disclosure, a method, a computer-readable medium, and an apparatus are provided. The apparatus may be a user equipment (UE). The apparatus may transmit a supported configuration of the UE for at least one of SRS transmission or CSI-RS reception for communication with a plurality of TRPs. The apparatus may receive, in response to transmitting the supported configuration, configuration information for at least one of the SRS transmission or the CSI-RS reception, wherein the configuration information is generated based on the supported configuration. The apparatus may communicate, with at least a subset of the plurality of TRPs, using at least one of the SRS transmission or the CSI-RS reception on resource elements assigned based on the configuration information. A base station connected to the TRPs may use the SRS/CSI-RS for cluster management and scheduling or to estimate downlink channels to determine precoding for downlink transmissions.

54 Claims, 14 Drawing Sheets

(58) Field of Classification Search
CPC ... H04L 5/0051; H04L 5/0091; H04L 5/0005; H04L 5/001; H04W 72/042; H04W 72/0446; H04B 7/024
See application file for complete search history.

(56) References Cited

OTHER PUBLICATIONS

Intel Corporation: "Details for UL Beam Management", 3GPP TSG RAN WG1 Meeting #88bis, 3GPP Draft; R1-1707354 Details for UL Beam Management, vol. RAN WG1, No. Hangzhou; May 15-19, 2017, May 14, 2017 (May 14, 2017), pp. 1-8, XP051272566, Retrieved from the Internet: URL: http://www.3gpp.org/ftp/Meetings_3GPP_SYNC/RAN1/Docs/ [retrieved on May 14, 2017], Section 2.
International Search Report and Written Opinion—PCT/US2019/039962—ISA/EPO—Oct. 11, 2019.
Nokia et al "UL SRS Design Considerations in NR", 3GPP TSG RAN WG1 Meeting #89, 3GPP Draft; R1-1708928, vol. RAN WG1, No. Hangzhou; May 15-19, 2017, May 6, 2017 (May 6, 2017), 7 Pages, XP051262775, Retrieved from the Internet: URL: http://www.3gpp.org/ftp/tsg_ran/WG1_RL1/TSGR1_89/Docs/ [retrieved on May 6, 2017], Section 2.

\* cited by examiner

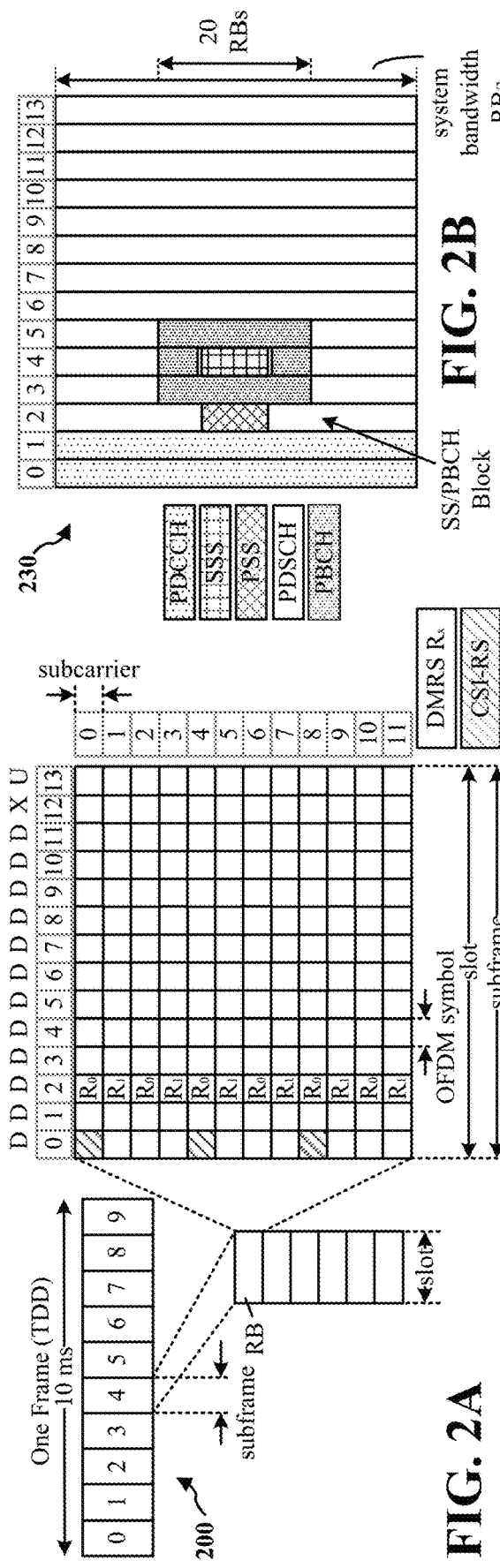
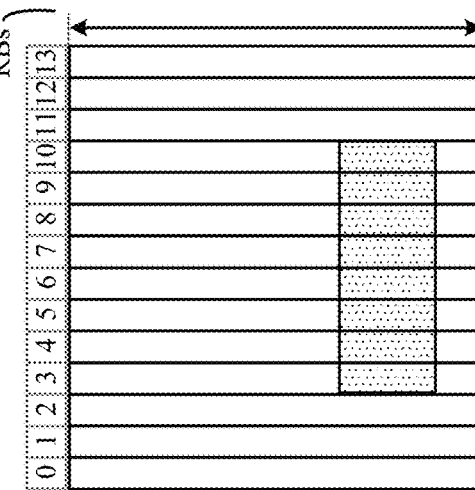
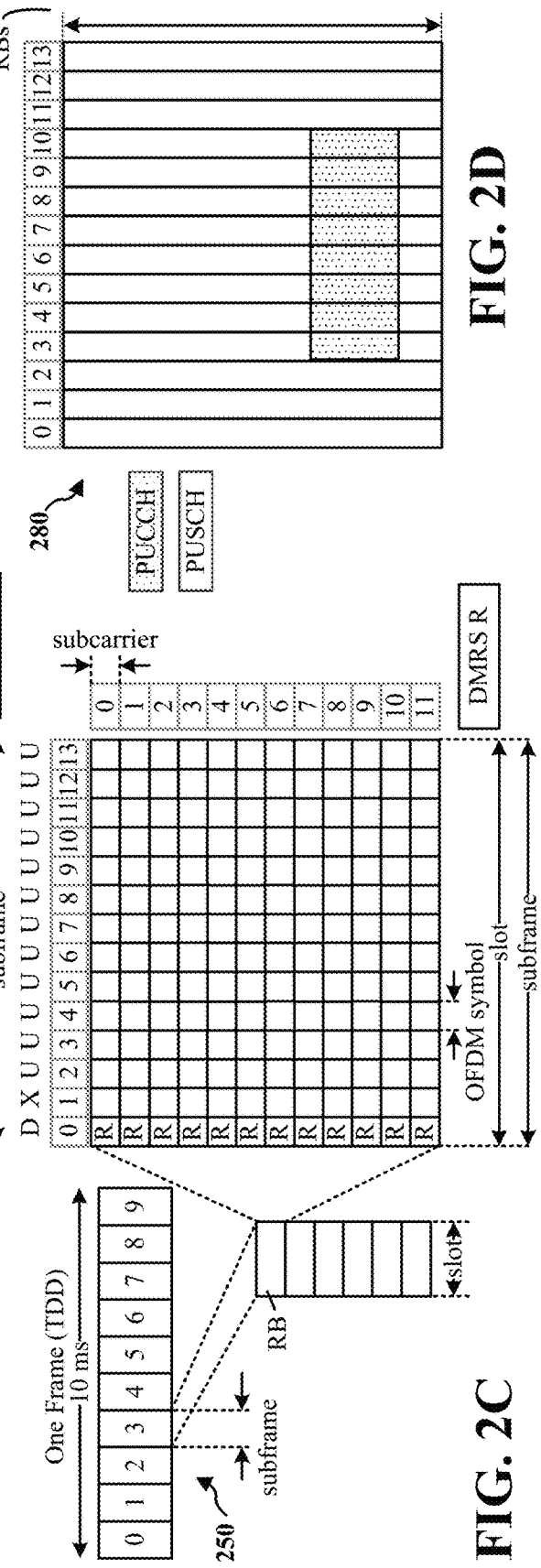
FIG. 2A  FIG. 2B  FIG. 2C  FIG. 2D

SOUNDING REFERENCE SIGNALS AND CHANNEL STATE INFORMATION REFERENCE SIGNALS ENHANCEMENTS FOR COORDINATED MULTIPOINT COMMUNICATIONS

CROSS REFERENCE TO RELATED APPLICATION(S)

This application claims the benefit of Greek Application No. 20180100309, entitled "Sounding Reference Signals and Channel State Information Reference Signals Enhancements for Coordinated Multipoint Communications" and filed on Jul. 9, 2018, which is expressly incorporated by reference herein in its entirety.

BACKGROUND

Technical Field

The present disclosure relates generally to communication systems, and more particularly, to coordinated multipoint (CoMP) communications.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. In certain configurations, the apparatus may be a user equipment (UE). The apparatus may transmit a supported configuration of the UE for at least one of sounding reference signal (SRS) transmission or channel state information reference signal (CSI-RS) reception for communication with a plurality of transmission reception points (TRPs). The apparatus may receive, in response to transmitting the supported configuration, configuration information for at least one of the SRS transmission or the CSI-RS reception, wherein the configuration information is generated based on the supported configuration. The apparatus may communicate, with at least a subset of the plurality of TRPs, using at least one of the SRS transmission or the CSI-RS reception on resource elements assigned based on the configuration information.

In certain other configurations, the apparatus may be a base station. The base station may be associated with one or more TRPs. The apparatus may receive a supported configuration by the UE of at least one of a SRS transmission and a CSI-RS reception for communication with a plurality of TRPs. The base station may generate configuration information for at least one of the SRS transmission and the CSI-RS reception by the UE. The configuration information may be generated based on the UE's supported configuration. The base station may transmit the generated configuration information to the UE. The base station may communicate with the UE through one or more TRPs using at least one of the SRS transmission and the CSI-RS reception on resource elements assigned based on the configuration information.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
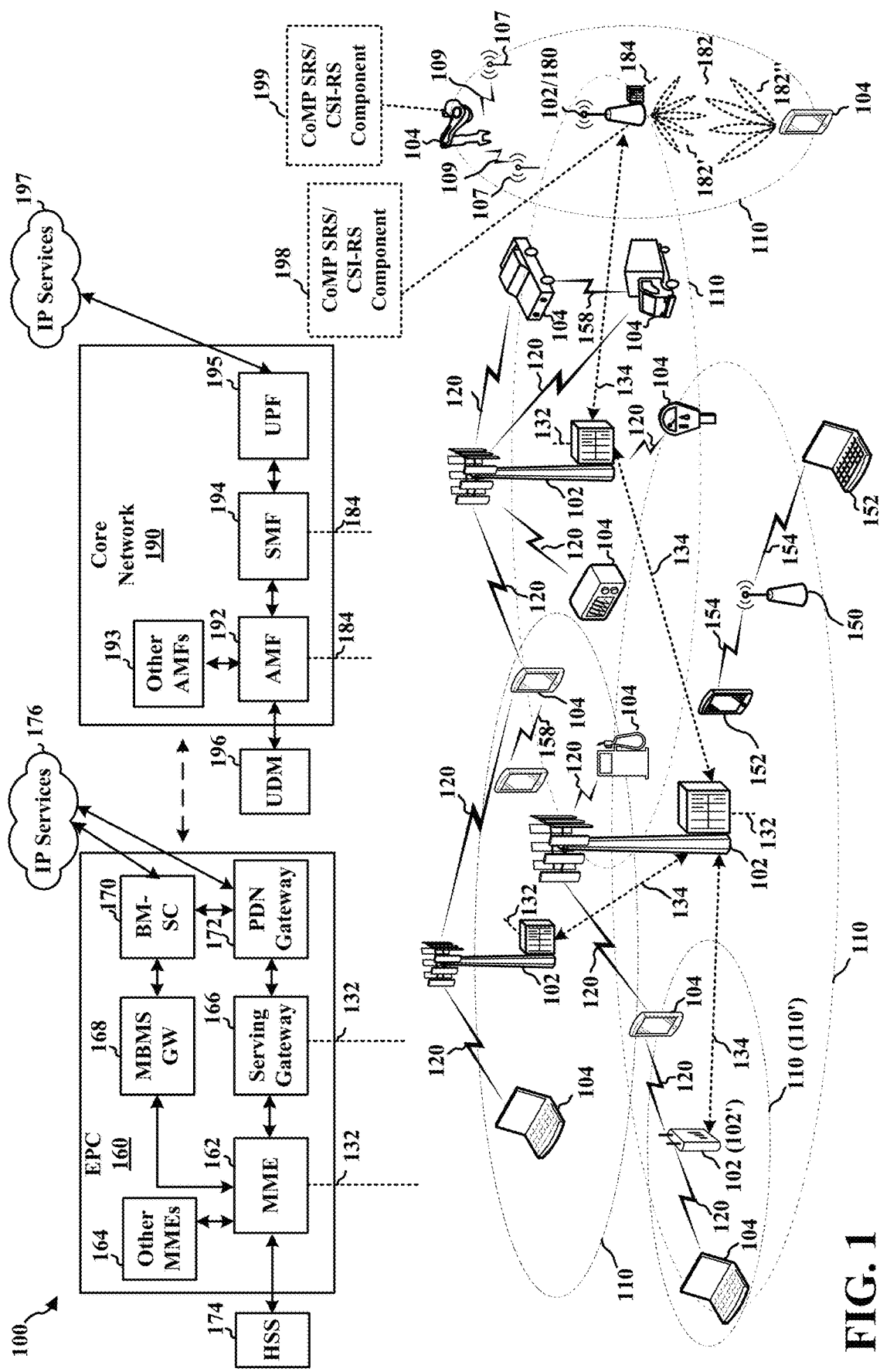
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In CoMP, the base station 102/180 may use reference signals, such as sounding reference signal (SRS) resources transmitted from a UE 104 to the base station 102/180 and channel state information reference signal (CSI-RS) resources transmitted from the base station 102/180 to the UE 104, to obtain link quality estimates. The base station may use the link quality estimates of uplink channels and downlink channels between the base station 102/180 and the UE 104 for cluster management and scheduling, such as identifying the TRPs or other base stations associated with the base station 102/180 that will be cooperating to transmit to the UE 104. FIG. 1 illustrates an example of multiple TRPs 107 associated with base station 102/180. As an example, FIG. 1 illustrates a UE 104 receiving CoMP communication 109 from multiple TRPs 107 associated with base station 102/180. The UE may be associated with factory equipment involved in factory automation, as an example.

The base station 102/180 may also use the SRS resources received from the UE 104 to estimate downlink channels to determine precoding for the downlink channels between the base station 102/180 and the UE 104 when the downlink channels and the uplink channels are similar, such as in a TDD system. The base station 102/180 may adapt downlink transmissions from the base station 102/180 to the UE 104 by precoding the downlink transmission based on the SRS resources.

In certain aspects, the UE 104 may comprise a CoMP SRS/CSI-RS component 199 configured to transmit to the base station 180 supported configuration of at least one of a SRS transmission and a CSI-RS reception and to receive configuration information from the base station 180 for at least one of the SRS transmission and the CSI-RS reception. The UE 104 may transmit SRS resources to the base station 180 and receive CSI-RS resources from the base station 180 based on resource elements assigned according to the configuration information, e.g., as described below in connection with any of FIGS. 2A-12. Similarly, the base station 180 may comprise a CoMP SRS/CSI-RS component 198 configured to receive configuration information from the UE 104 for at least one of the SRS transmission and the CSI-RS reception, and to transmit configuration information to the UE 104 for at least one of the SRS transmission and the CSI-RS reception by the UE 104. The base station 180 may receive SRS resources from the UE 104 and transmit CSI-RS resources to the UE 104 based on resource elements assigned according to the configuration information, e.g., as described below in connection with any of FIGS. 2A-12. Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu * 15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where $100x$ is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
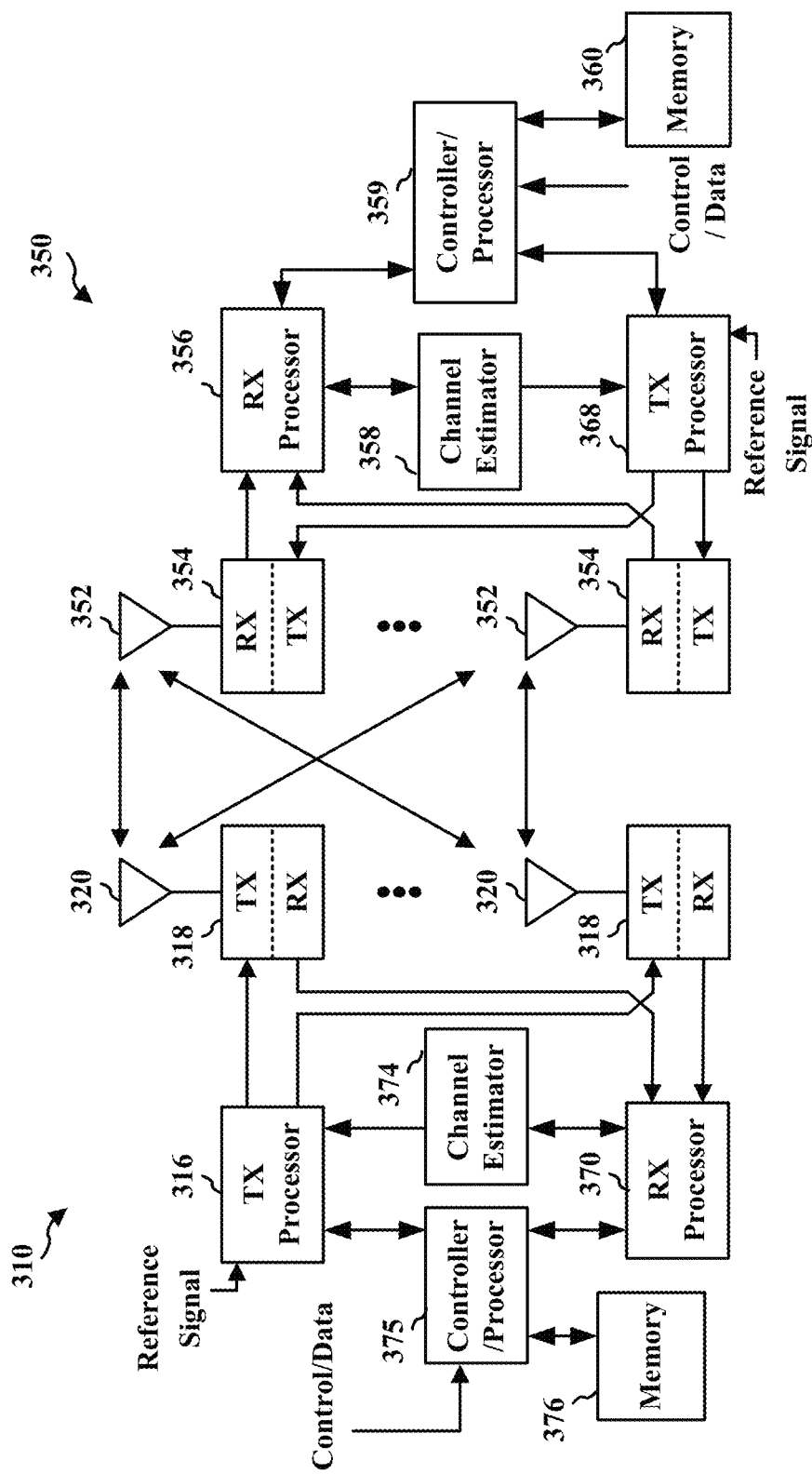
FIG. 3 is a diagram illustrating an example of a base station and user equipment (UE) in an access network.

FIG. 3 is a block diagram of a base station 310 in communication with a UE 350 in an access network. In the DL, IP packets from the 5GC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the 5GC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the 5GC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 199 of FIG. 1.

At least one of the TX processor 316, the RX processor 370, and the controller/processor 375 may be configured to perform aspects in connection with 198 of FIG. 1.

Figure 4:
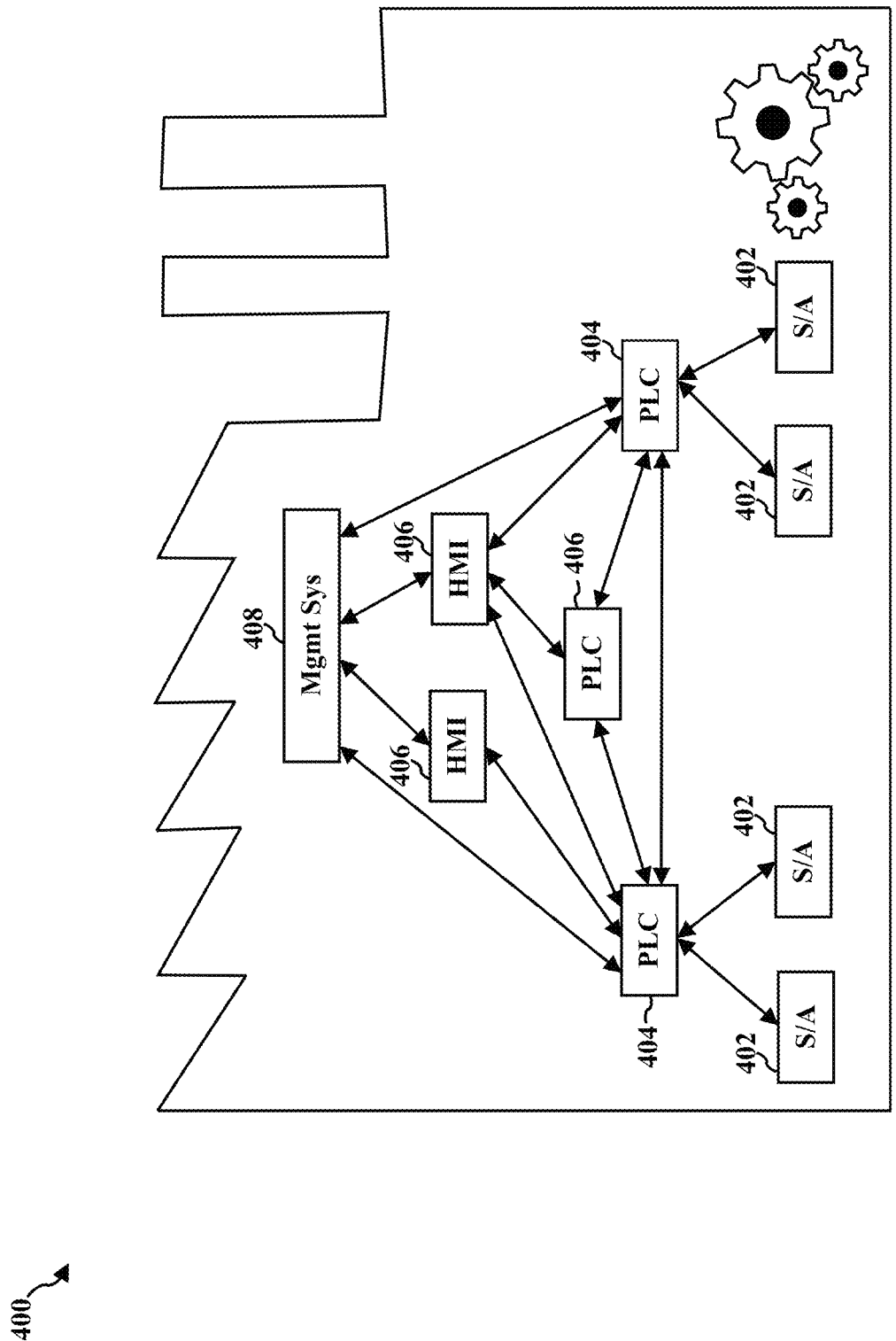
FIG. 4 is a diagram illustrating an example factory that may deploy CoMP in accordance with certain aspects of the disclosure.

A base station may use CoMP techniques to communicate between multiple TRPs associated with a base station and one or more UE. CoMP techniques may include a coherent joint transmission technique, a non-coherent joint transmission technique, and/or a muting technique to improve spatial diversity with a UE. As an example, CoMP may be employed in FA. The base station may use spatial diversity techniques among the TRPs when communicating with a UE to realize ultra-reliability and low latency communication (URLLC) (e.g., less than 1 ms latency and $10^{-6}$ reliability). FIG. 4 is a diagram illustrating an example factory environment 400 that may deploy CoMP in accordance with certain aspects of the disclosure. The factory environment 400 may include, e.g., at least one sensor/actuator (S/A) 402, at least one programmable logic controller (PLC) 404, at least one human machine interface (HMI) 406, and at least one management system 408. The SA 402, the PLC 404, the HMI 406, and/or the management system 408 may correspond to UEs, e.g., UE 104, 350, that receive wireless communication from a base station, e.g., 102, 180, 310.

In certain implementations, an S/A 402 may include one or more device components, e.g., such as a rotary motor, linear servo, and/or position sensor, just to name a few. An S/A 402 may receive one or more commands (e.g., instructing motion) from at least one PLC 404, and the S/A 402 may send sensor information (e.g., related to the motion, position, acceleration of the device or a component of the device). Multiple PLCs 404 may coordinate with one another in order to assure the correct instructions are sent to an S/A 402, and/or to act as a relay between an HMI 406 and an S/A 402.

An HMI 406 may include, e.g., a tablet device, a handheld device, a wireless device, a panel device, a wearable device, a virtual reality (VR) device, and/or an augmented reality (AR) device, just to name a few. An HMI 406 may control an S/A 402. For example, a user may input instructions into the HMI 406 such as "start" or "stop," in order to control the motion and/or actions of an SA 402. In another example, a user may input instructions into the HMI such as "change mode from 'widget 1' to 'widget 2.'" Instructions input into an HMI 406 may be sent to a PLC 404, and the PLC 404 may configure the instructions (e.g., using custom hardware) so that the instructions may be understood by an S/A 402.

The management system 408 may include, e.g., one or more of an industrial personal computer (PC), controller programming, software, security management, and/or provide long term key performance indicator (KPI) (e.g., a value that demonstrates how effectively the example factory environment 400 is achieving key business objectives). The management system 408 may receive information related to KPI from one or more HMIs 406. The management system 408 may send instructions to one or more of the HMI(s) 406, PLC(s) 404, and/or S/A(s) 402.

The example factory environment 400 may include, e.g., multiple production cells (e.g., 2, 10, 100, 1000, 10000, etc.), and each production cell may have dimensions of, e.g., 10 m×10 m×3 m. Each production cell may include multiple S/As 402. An example production cell may include, e.g., 1-50 S/As 402 or more than 50 S/As 402.

Communications between devices in the example factory environment 400 may be effected, e.g., using one or more base stations, nodes, and/or TRPs (e.g., TRPs 107) located within a production cell. For communications relating to factory automation, one objective may be to meet latency and/or reliability target threshold(s) in the presence of signal fading, shadowing, and/or other scenarios that may occur in a factory environment in which moving parts and/or reflective surfaces may obstruct the line of sight between a sending device (e.g., TRP, UE, PLC, S/A, etc.) and a receiving device (e.g., TRP, UE, PLC, S/A, etc.).

To meet certain latency and/or reliability target thresholds such as an ultra-reliability and low latency configuration (URLLC) (e.g., less than 1 ms latency and $10^{-6}$ reliability) within a factory setting, a wireless communication system may exploit spatial diversity. Spatial diversity may be achieved using multiple TRPs (e.g., TRPs 107) and/or base stations that communicate with the UE. The TRPs may employ concurrent joint transmission (JT)-CoMP communications to a UE, non-coherent joint transmission communications to a UE, or a muting technique where one or more TRPs are muted and others are transmitting in resources assigned for communications with a UE.

Figure 5:
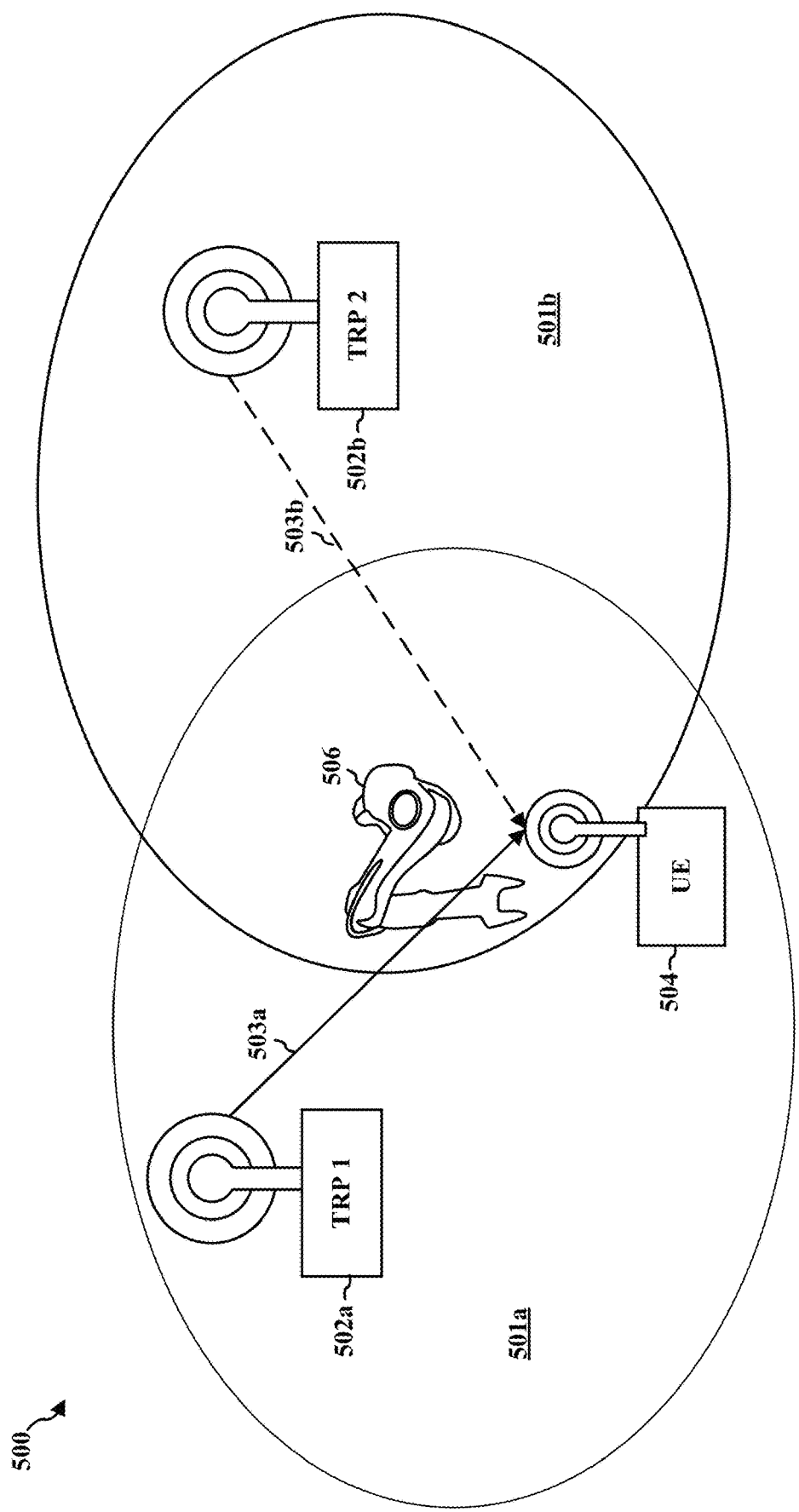
FIG. 5 illustrates a wireless communication system that may use joint transmission (JT)-CoMP in accordance with certain aspects of the disclosure.

FIG. 5 illustrates a wireless communication network 500 that may use CoMP in accordance with certain aspects of the disclosure. The wireless communication network 500 may be used in, e.g., the example factory environment 400 described above in connection with FIG. 4. The wireless communication network 500 may include a first TRP 502*a* located in a first cell 501*a*, a second TRP 502*b* located in a second cell 501*b*, a UE 504 located at a cell edge of the first cell 501*a* and the second cell 501*b*, and a moveable device 506 that may be used in an automated process. The first TRP 502*a* and second TRP 502*b* may each correspond to, e.g., a base station, e.g., base station 102, 180, 310. The first TRP 502*a* and the second TRP 502*b* may be connected to a central unit (CU) that may connect to other TRPs. In one aspect, the CU may be part of a base station, e.g., base station 102, 180, 310. In one aspect, the base station may include one or more of a CU, one or more distributed units, and multiple TRPs. The UE 504 may correspond to, e.g., UE 104, 350. The UE 504 may also correspond to any of the S/A 402, the PLC 404, the HMI 406, or the management system 408 in FIG. 4. Although two TRPs 502*a*, 502*b* are illustrated in FIG. 5, the wireless communication system 500 may include more than two TRPs 502*a*, 502*b* that may be used as a CoMP cluster for sending CoMP communications to the UE 504.

To meet requirements for URLLC within a factory environment, the wireless communication network 500 may perform CoMP by sending concurrent downlink transmissions 503*a*, 503*b* from multiple TRPs 502*a*, 502*b* (e.g., a CoMP cluster) to the UE 504. However, the performance gains achieved using CoMP may be sensitive to channel estimation errors that may arise when a moveable device 506 obstructs the direction in which a downlink transmission 503*a* is sent, and/or when the UE 504 moves throughout the network.

A CU or a base station connected to the CoMP cluster of TRPs may identify which TRPs may cooperate to transmit to the UE 504 as part of cluster management and scheduling. The base station may use reference signals, such as SRS transmitted by UE 504 and received by TRPs 502*a*, 502*b*, and CSI-RS transmitted by TRPs 502*a*, 502*b* to UE 504, to obtain link quality estimates of uplink channels and downlink channels between TRPs 502*a*, 502*b* and UE 504. For example, the base station may configure the UE to transmit the SRS on resource elements in a slot. The UE may transmit the SRS on the configured resource elements and the base station may measure the received SRS. The base station may use the SRS measurements to generate an uplink channel estimate and downlink channel estimates for cluster management and scheduling. The base station may also use the downlink channel estimates to determine precoding to adapt downlink transmissions from the TRPs 502*a* and 502*b* to the UE 504. Aspects presented herein improve the allocations and use of SRS resources and CSI-RS for cluster management and scheduling and/or for precoding in CoMP. Aspects help to improve the efficient use of wireless resources and reduction in power consumption while meeting the unique needs of CoMP, e.g., including cluster management, scheduling and/or precoding.

Figure 6:
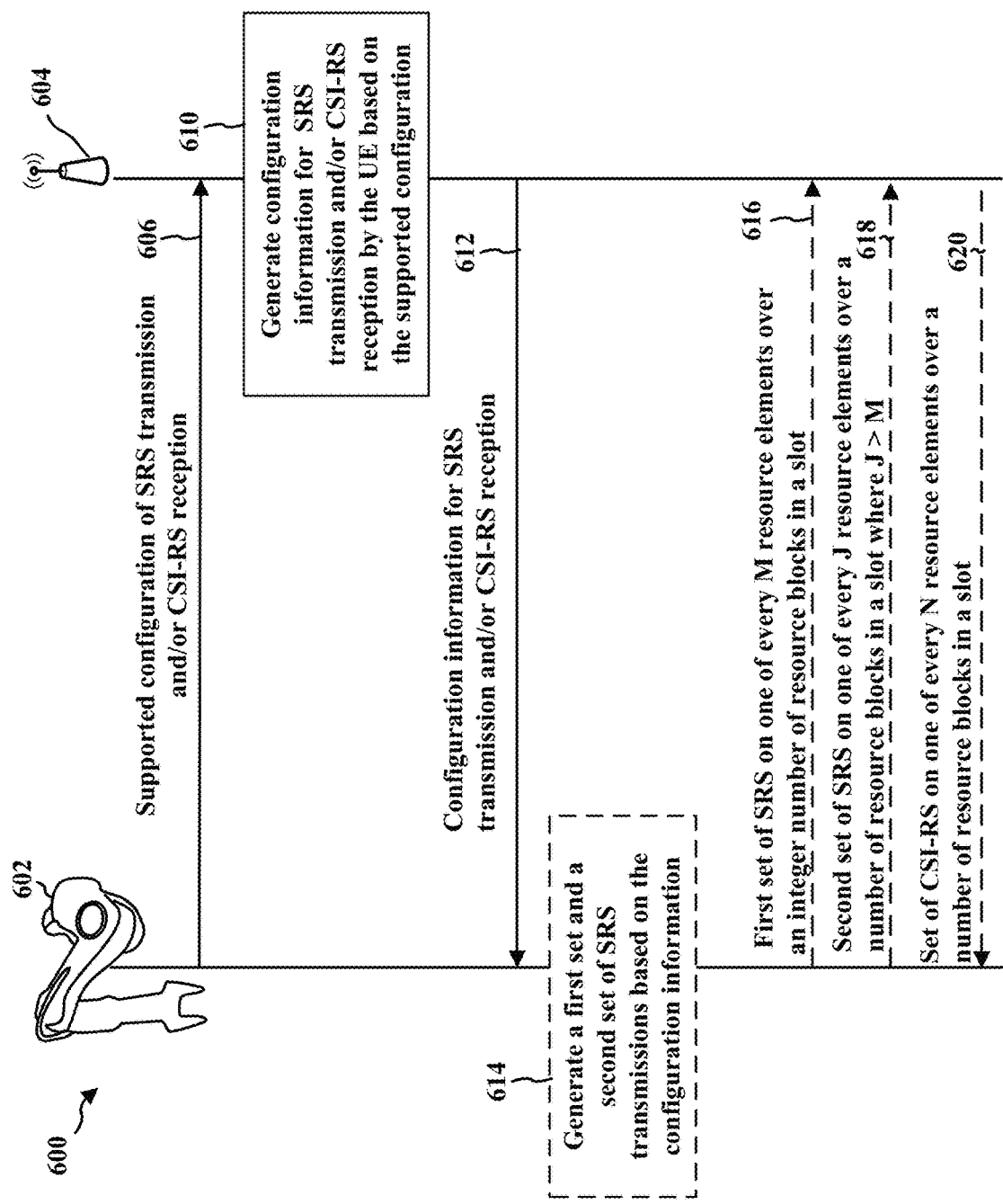
FIG. 6 is a call flow diagram illustrating an implementation of communication between a UE and a TRP of supported configuration information of the UE, programmed configuration information from the TRP, and the transmission and reception of SRS and CSI-RS based on the programmed configuration information in accordance with certain aspects of the disclosure.

FIG. 6 is a call flow diagram 600 illustrating example aspects of communication between a UE 602 and a TRP 604. The communication may include supported configuration information of the UE, programmed configuration information from the TRP, and the transmission and reception of SRS and CSI-RS based on the programmed configuration information in accordance with certain aspects of the disclosure. The TRP 604 may be part of a CoMP cluster that may connect to a base station, e.g., base station 102, 180, 310.

In 606, the UE 602 may transmit its supported configuration for uplink SRS transmission to the TRP 604 and/or its supported configuration for downlink CSI-RS reception from the TRP 604. As mentioned, the TRP 604 or the base station connected to the TRP 604 may measure the SRS resources transmitted from the UE 602 to estimate the downlink channel between the TRP 604 and the UE 602 to determine precoding to be applied to downlink transmission when the downlink channels and the uplink channels are similar, such as in a time domain duplex (TDD) system. The UE 602 may transmit the SRS on resource elements in one or more resource blocks in a slot (e.g., in the last symbol of a subframe).

SRS may be transmitted up to a maximum density of one of every 2 resource elements (e.g., comb-2 SRS transmission) over a span of at least 4 resource blocks in a symbol (a resource element in a symbol may also be referred to as a subcarrier). However, a different density may be needed to use the SRS to estimate a downlink channel for precoding purposes. Aspects presented herein enable use of a higher density of the resource elements in a slot to transmit the SRS, which may lead to more accurate estimates of the downlink channel and thus more accurate precoding of the downlink transmissions from the TRP 604 to the UE 602, the UE 602 may support transmitting the SRS on every resource element (e.g., comb-1 SRS transmission).

For example, to meet URLLC requirements in factory automation, the CoMP may send small downlink packets that only occupy one resource block. Thus, having a UE transmit the SRS over a span of a minimum of four resource blocks may lead to a waste of wireless resource and power consumption at the UE. To reduce resource consumption and processing overhead, the UE 602 may support transmitting the SRS on the resource elements in less than 4 resource blocks. In one aspect, the UE 602 may support transmitting the SRS over a span of an integer number of resource blocks in a slot with a granularity of one resource block. In one aspect, the UE 602 may support transmitting the SRS on every resource element over a span of less than 4 resource blocks (e.g., 1, 2, or 3 resource blocks) in a slot. Thus, the UE may transmit SRS that occupies every resource element in a single resource block. Transmission of the SRS on every resource element (e.g., each subcarrier in a symbol) in one or more resource blocks in a slot may be referred to as a comb-1 SRS transmission.

The TRP 604 or the base station connected to the TRP 604 may measure the SRS received from the UE 602 to estimate the downlink channel for cluster management and scheduling. For example, the base station connected to a group of TRPs may measure the SRS received at a number of the TRPs to obtain link quality estimates from the group of TRPs to the UE 602. The base station may use the link quality estimates to identify a subset of the TRPs that may cooperate to transmit to the UE 602. The resource elements required to estimate the downlink channel for cluster management and scheduling may not be as high as the resource elements required to estimate the downlink channel for the precoding determination. Nevertheless, the resource consumption required scales with the density of the resource elements used for the SRS and the number of UEs in the CoMP. A UE may be able to transmit the SRS down to a minimum density of one of every 4 resource elements (e.g., comb-4 SRS transmission). However, this density may be beyond what is needed for cluster management and scheduling. Thus, the transmission of SRS with a density of one of every four resource elements may cause an inefficient use of power and wireless resources. In one aspect, to reduce the density of SRS transmission further, the UE 602 may support transmitting the SRS on one of every N resource elements (subcarriers) over a span of a number of resource blocks in a slot, where N is greater than 4.

In one aspect, the UE 602 may measure a received CSI-RS transmitted from the TRP 604 to estimate the downlink channel. The UE 602 may transmit the link quality estimates of the downlink channel to the TRP 604 for the TRP 604 or the base station connected to the TRP 604 to perform cluster management and scheduling. Similar to the resource requirement for the SRS, the resource requirement for the CSI-RS scales with the density of the resource elements used for the CSI-RS transmissions and the number of UEs in the CoMP. CSI-RS with a minimum density of one of every 24 resource elements over a minimum of 24 resource blocks, may lead to an inefficient use of wireless resources and power. Such a density may be more than needed for cluster management/scheduling for CoMP. In one aspect, to reduce the density of CSI-RS transmission by the TRP 604, the UE 602 may support receiving the CSI-RS on one of every N resource elements over a span of a number of resource blocks in a slot, where N is greater than 24. In one aspect, the UE 602 may support receiving the CSI-RS over a span of less than 2 resource blocks in a slot. In one aspect, the UE 602 may support receiving more than a threshold number of CSI-RS resources from a number of TRPs connected with the base station during a slot. In one aspect, the threshold number of CSI-RS resources received in a slot includes a threshold number of non-zero power (NZP) CSI-RS resources received in a component carrier during a slot, where the threshold number of NZP CSI-RS resources is greater than 32.

The TRP 604 may receive the information indicating the configuration supported by the UE 602 for uplink SRS transmission and for downlink CSI-RS reception. The TRP 604 or the base station connected to the TRP 604 may generate, at 610, configuration information for SRS transmission(s) from the UE 602 to the TRP 604 or configuration information for reception by the UE 602 of CSI-RS(s) transmitted from the TRP 604 based on the supported configuration of the UE 602. The supported configuration of the UE 602 may set the upper bounds of the configuration information generated for the UE 602. For example, if the UE 602 supports comb-1 SRS transmissions over a span of less than 4 resource blocks in a slot, the TRP 604 or the base station connected to the TRP 604 may generate configuration information for the UE 602 to transmit the SRS on every resource element over a span of 1 resource block in a slot for the TRP 604 or the base station connected to the TRP 604, e.g., to enable the TRP to estimate the downlink channel for downlink transmission precoding. In another example, if the UE 602 supports greater than comb-4 SRS transmissions over a number of resource blocks in a slot, the TRP 604 or the base station connected to the TRP 604 may generate configuration information for the UE 602 to transmit the SRS on one of every 5 resource elements over a span of two resource blocks in a slot for the TRP 604 or the base station connected to the TRP 604, e.g., to enable the TRP to estimate the downlink channel for cluster management and scheduling.

In one aspect, the configuration information generated at 610 may include a periodicity of the resource blocks, slots, subframes, etc., used for the SRS transmissions. The configuration information may include a sequence and a cyclic shift of the sequence used to transmit the SRS. The configuration information may include a time hopping sequence used to transmit the SRS. The configuration information may include a comb-offset range. The configuration information may include a position of the first resource element and/or a position of the last resource element in addition to the comb value. The resource elements used for the SRS transmission may be configured to use a sequence and a cyclic shift of the sequence in the time domain or a phase ramp in the frequency domain. In this way, different UEs may use the same resource elements for the transmissions of their respective SRS resources by using different cyclic shifts of a sequence or using different sequences. In one aspect, the set of cyclic shifts for a sequence that may be used for the SRS transmissions may depend on the comb value of the SRS resources (e.g., comb-2 or comb-4). In one aspect, the number of cyclic shifts for a sequence may also depend on the number of resource elements or subcarriers in a symbol used for the SRS transmissions. For example, if 30 resource elements in a symbol are used for the SRS transmissions, up to 30 cyclic shifts may be configured. If 50 resource elements in a symbol are used for the SRS transmission, up to 50 cyclic shifts may be configured. In one aspect, the number of cyclic shifts for a sequence may depend on a duration of the symbol and the delay spread of the uplink channel.

In one aspect, if the UE 602 supports greater than comb-24 CSI-RS receptions over a span of less than two resource blocks in a slot, the TRP 604 or the base station connected to the TRP 604 may generate configuration information for the UE 602 to receive CSI-RS on one of every 25 resource elements over a span of 1 resource blocks in a slot (e.g., use only 1 resource element in 1 resource block in a slot) to estimate the downlink channel for cluster management and scheduling. In one example, the TRP 604 or the base station connected to the TRP 604 may generate configuration information for the UE 602 to receive CSI-RS on one of every 24 resource elements as supported by the existing 5G standard but over a span of less than 24 resource blocks. In one aspect, the generated configuration information may include one of more of a periodicity of the resource blocks, slots, subframes, etc., used for the CSI-RS receptions, a time hopping sequence used to transmit the CSI-RS by the TRP 604, the position of the first resource block used for the CSI-RS receptions, the position of the first resource element within the resource blocks used for the CSI-RS receptions, etc., in addition to the density of the resource elements and the number of resource blocks spanned by the resource elements used for the CSI-RS receptions.

In 612, the TRP 604 may transmit to the UE 602 the generated configuration information for one or more SRS transmissions from the UE 602 to the TRP 604 or configuration information for one or more receptions by the UE 602 of CSI-RS transmitted from the TRP 604. In one aspect, the TRP 604 may transmit the generated configuration information in one or more of a radio resource control (RRC) message, a medium access control (MAC) control element (CE), a non-access stratum (NAS) message, or downlink control information (DCI).

In 614, based on the configuration information received from the TRP 604, the UE 602 may generate one or more SRS transmissions to the TRP 604. Similarly, the UE may use the configuration information to receive the CSI-RS transmitted from the TRP 604. In one aspect, if the configuration information indicates the UE 602 may transmit the SRS on every resource element over a span of 1 resource block, the UE 602 may generate a first set of SRS on every resource element of a resource block in a slot. In one aspect, the UE 602 may generate a first set of SRS on every resource element over a span of 2 resource blocks in a slot. The UE 602 may generate the first set of comb-1 SRS transmissions or other dense SRS transmissions over a span of one or more resource blocks in a slot for the TRP 604 or the base station connected to the TRP 604 to estimate the downlink channel for downlink transmission precoding.

In one aspect, if the configuration information indicates the UE 602 may transmit the SRS on comb-5 SRS transmission or other comb-N SRS transmissions greater than comb-4, the UE 602 may generate a second set of SRS on one of every 5 resource elements or one of every resource elements of values greater than 4 over a span of one or more resource blocks in a slot for the TRP 604 or the base station connected to the TRP 604 to estimate the downlink channel for cluster management and scheduling. In one aspect, the UE 602 may generate a sequence and a cyclic shift of the sequence used to transmit the second set of SRS based on the configuration information. In one aspect, the UE 602 may generate a time hopping sequence and may generate the second set of SRS using the time hopping sequence based on the configuration information. The density of the resource elements used for the first set of SRS may be higher than the density of the resource elements used for the second set of SRS. In other words, the comb value of the second set of SRS may be greater than the comb value of the first set of SRS.

In one aspect, if the configuration information indicates the UE 602 may receive CSI-RS on one of every N resource elements over a span of one or more resource blocks where N is 25 or other values greater than 24, the UE 602 may configure itself to receive the CSI-RS on one of every 25 resource elements or one of every resource elements of values greater than 24 over a span of one or more resource blocks in a slot.

Figure 7:
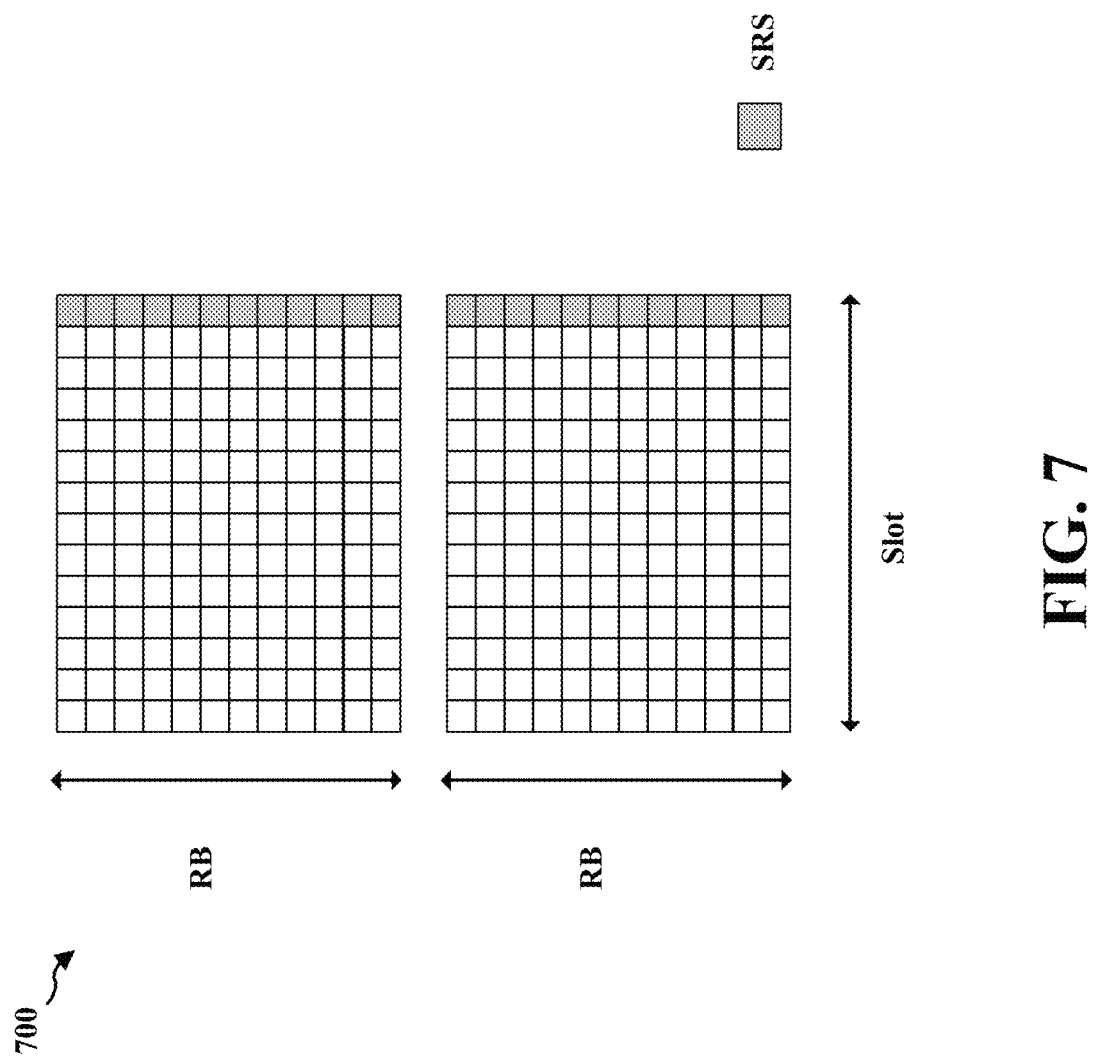
FIG. 7 illustrates a configuration of using every resource element or subcarrier over a span of two resource blocks in a slot to transmit SRS resources from a UE to support precoding for downlink transmissions in accordance with certain aspects of the disclosure.

In 616, the UE 602 may transmit the generated first set of SRS to the TRP 604. For example, the UE 602 may transmit a first set of comb-1 SRS transmission over a span of one or more resource blocks in a slot for the TRP 604 or the base station connected to the TRP 604 to estimate the downlink channel for downlink transmission precoding. FIG. 7 illustrates an example of an SRS transmission over each resource element of a resource block that may span one resource block or two resource blocks.

Figure 8:
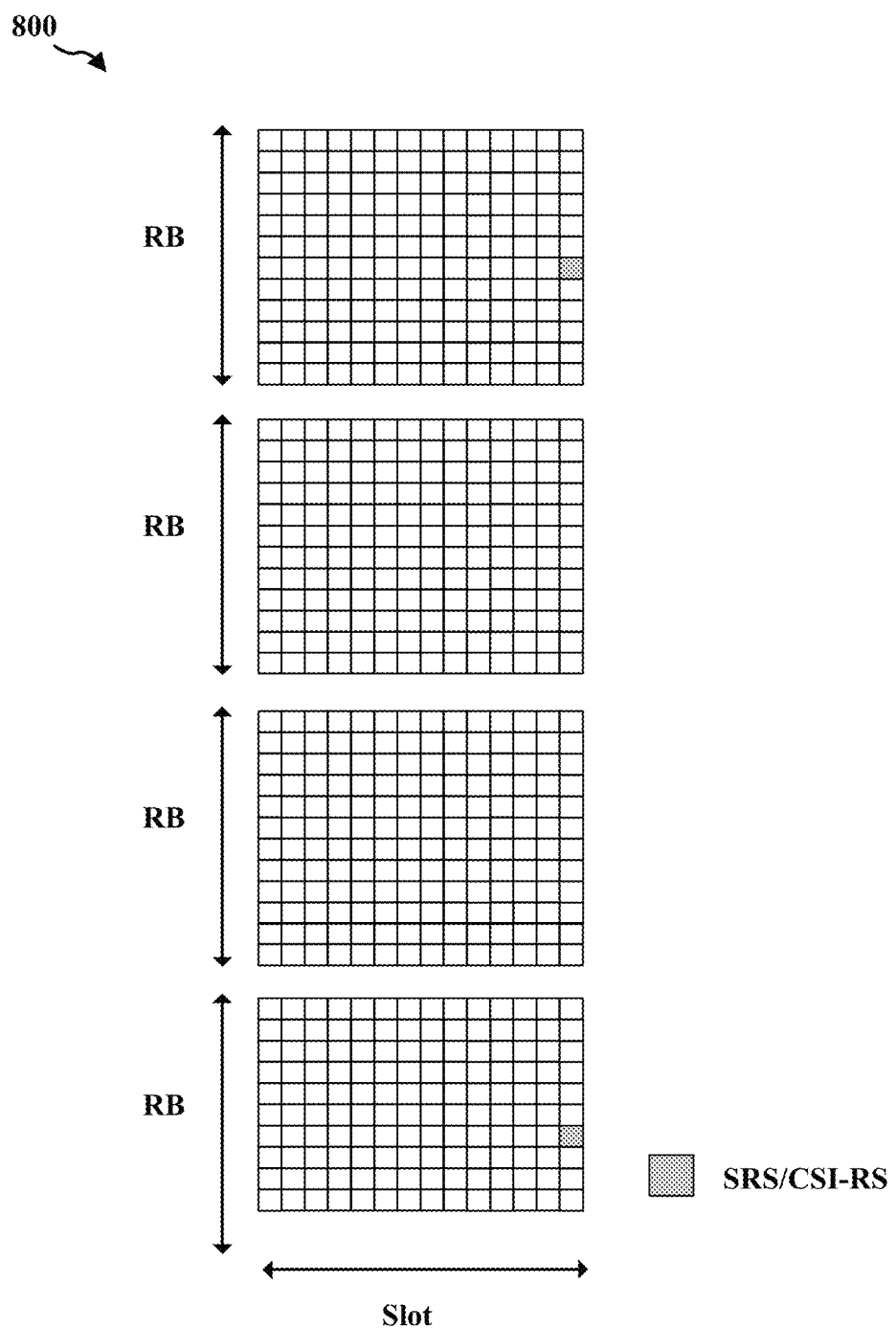
FIG. 8 illustrates a configuration of using one of every 36 resource elements or subcarriers over a number of resource blocks in a slot to transmit SRS resources from a UE to support cluster management and scheduling in accordance with certain aspects of the disclosure.

In 618, the UE 602 may transmit the generated second set of SRS to the TRP 604. The second set of SRS may have a different density that the first set of SRS, and may be for different use by the TRP or base station. For example, the UE 602 may transmit a second set of comb-5 SRS transmission over a span of one or more resource blocks in a slot for the TRP 604 or the base station connected to the TRP 604 to estimate the downlink channel for cluster management and scheduling. FIG. 8 illustrates an example of an SRS transmission having an example density.

In 620, the UE 602 may receive a set of CSI-RS from the TRP 604 based on the configuration information received in 612. For example, the UE 602 may receive a set of CSI-RS on one of every 25 resource elements over a span of one or more resource blocks in a slot. The UE 602 may measure the CSI-RS resources and may transmit the measured CSI-RS resources to the TRP 604 for the TRP 604 to estimate the downlink channel for cluster management and scheduling. FIG. 8 illustrates an example of an CSI-RS transmission having an example density.

FIG. 7 illustrates a configuration 700 of using every resource element or subcarrier over a span of two resource blocks in a slot to transmit SRS resources from a UE to support precoding for downlink transmissions in accordance with certain aspects of the disclosure. In the comb-1 SRS transmissions of FIG. 7, all twelve resource elements in the last symbol of each of the two resource blocks are used to transmit the SRS.

FIG. 8 illustrates a configuration 800 of using one of every 36 resource elements or subcarriers over a number of resource blocks in a slot to transmit SRS resources from a UE to support cluster management and scheduling in accordance with certain aspects of the disclosure. In the comb-36 transmissions of FIG. 8, the two resource elements used to transmit the SRS are separated by 36 resource elements in the last symbol over a span of four resource blocks in the slot. FIG. 8 may also illustrate a configuration of using one of every 36 resource elements or subcarriers over a number of resource blocks in a slot to receive CSI-RS resources from a TRP to support cluster management and scheduling.

Figure 9:
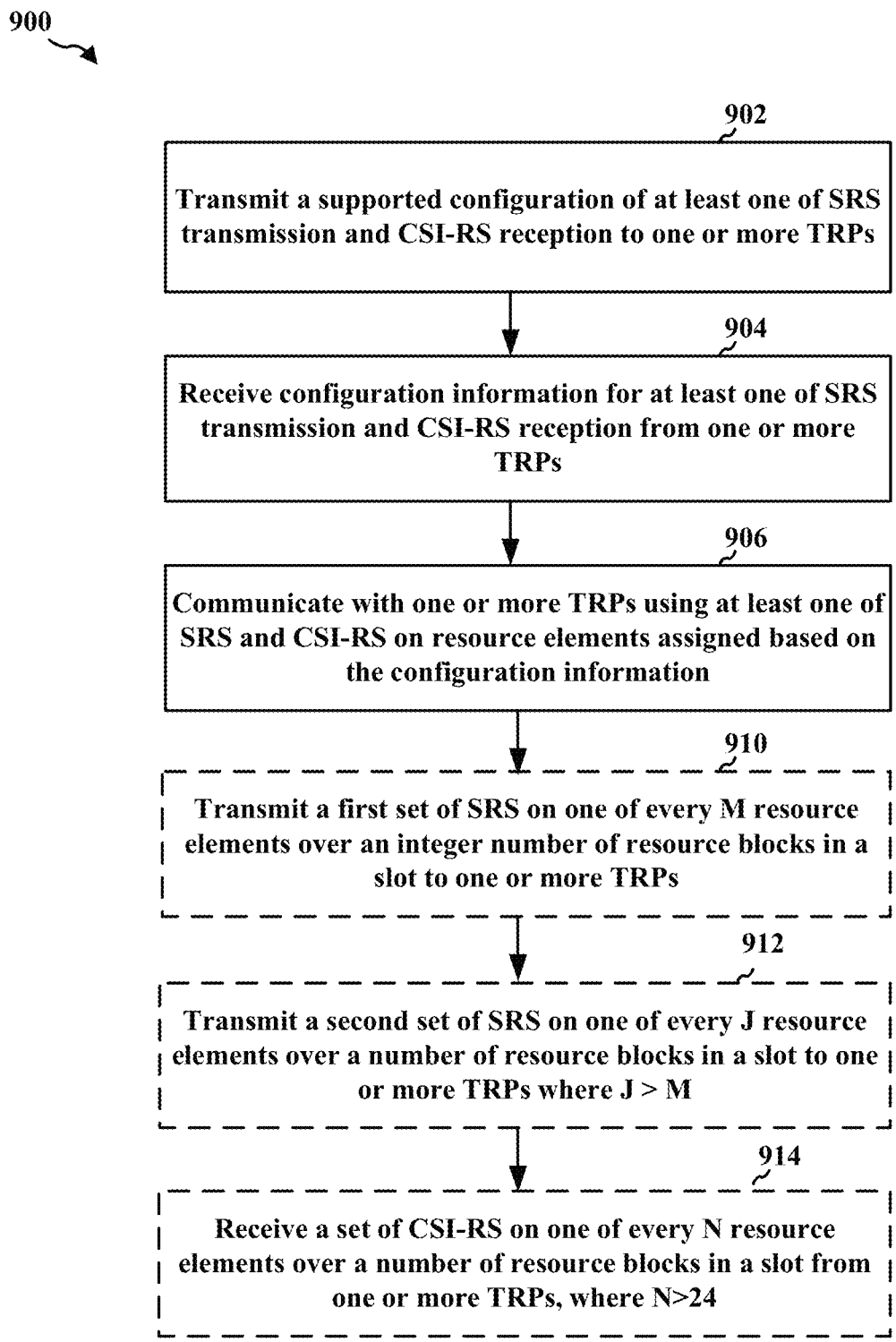
FIG. 9 is a flowchart of a method of wireless communication that may be implemented by a UE in accordance with certain aspects of the disclosure.

FIG. 9 is a flowchart 900 of a method of wireless communication that may be implemented by a UE or a component of a UE (e.g., UE 104, 350, 504, 602; the apparatus 1000, 1000'; the processing system 1114, which may include the memory 360 and which may be the entire UE 350 or a component of the UE, such as the TX processor 368, the RX processor 356, and/or the controller/processor 359). The method may be performed by the UE configured to support CoMP. Optional aspects are illustrated with a dashed line. The method may help the UE to transmit SRS and/or receive CSI-RS in a more efficient manner that supports the unique needs of cluster management and scheduling in CoMP and/or precoding for downlink transmissions in CoMP.

At 902, the UE may transmit its supported configuration for uplink SRS transmission and/or its supported configuration for downlink CSI-RS reception for communication with a plurality of TRPs. The UE may transmit the supported configuration information to one or more TRPs. For example, support component 1004 and/or transmission component 1002 of apparatus 1000 may transmit the supported configuration. As use of a higher density of the resource elements in a slot to transmit the SRS may lead to more accurate estimates of the downlink channel and thus more accurate precoding of the downlink transmissions from the TRPs to the UE, the UE may support transmitting the SRS on every resource element (e.g., comb-1 SRS transmission). In one aspect, the UE may support transmitting the SRS over a span of an integer number of resource blocks in a slot with a granularity of one resource block. In one aspect, the UE may support transmitting the SRS on every resource element over a span of less than 4 resource blocks (e.g., 1, 2, or 3 resource blocks) in a slot. In one aspect, to reduce the density of SRS transmission for cluster management and scheduling, the UE may support transmitting the SRS on one of every N resource elements over a span of a number of resource blocks in a slot, where N is greater than 4.

In one aspect, to reduce the density of CSI-RS transmission by the TRPs, the UE may support receiving the CSI-RS on one of every N resource elements over a span of a number of resource blocks in a slot, where N is greater than 24. In one aspect, the UE may support receiving the CSI-RS over a span of less than 2 resource blocks in a slot. In one aspect, the UE may support receiving more than a threshold number of CSI-RS resources from a number of TRPs connected with the base station during a slot. In one aspect, the threshold number of CSI-RS resources received in a slot includes a threshold number of non-zero power (NZP) CSI-RS resources received in a component carrier during a slot, where the threshold number of NZP CSI-RS resources is greater than 32.

At 904, the UE may receive, in response to transmitting the supported configuration(s), configuration information for SRS transmission(s) from the UE to the TRPs and/or configuration information for reception by the UE of CSI-RS(s) from the TRPs based on the supported configuration of the UE. For example, configuration component 1008 and/or reception component 1006 of apparatus 1000 may receive the configuration information. The configuration information may be received from the TRPs in one or more of an RRC message, a MAC CE, a NAS message, or a DCI. The supported configuration of the UE may set the upper bounds of the configuration information generated for the UE. In one aspect, if the UE supports comb-1 SRS transmissions over a span of less than 4 resource blocks in a slot, the UE may receive configuration information to transmit the SRS on every resource element over a span of 1 resource block in a slot. In another example, if the UE supports greater than comb-4 SRS transmissions over a number of resource blocks in a slot, the UE may receive configuration information to transmit the SRS on one of every 5 resource elements over a span of two resource blocks in a slot. In one aspect, if the UE supports greater than comb-24 CSI-RS receptions over a span of less than two resource blocks in a slot, the UE may receive configuration information for the UE to receive CSI-RS on one of every 25 resource elements over a span of 1 resource blocks in a slot from the TRPs.

At 906, the UE may communicate with at least a subset of the plurality of TRPs using the SRS transmission(s) and/or the CSI-RS reception on resource elements assigned based on the configuration information. Based on the configuration information received from the TRPs, the UE may generate one or more SRS transmissions to the TRPs or may configure itself to receive the CSI-RS transmitted from the TRPs. For example, the supported configuration may comprise an SRS comb density supported by the UE, and the UE's communication with at least a subset of the TRPs may include transmitting the SRS transmission on resource elements assigned based on the comb density supported by the UE. The SRS transmission may comprise a cyclic shift based on a number of the resource elements assigned for the SRS transmission. A number of cyclic shifts in a set of cyclic shifts for a sequence for the SRS transmissions may be based on a value of the comb density or a number of resource elements assigned for the SRS transmission. In one aspect, if the configuration information indicates that the UE may transmit the SRS on every resource element over a span of 1 resource block, the UE may generate a first set of SRS on every resource element of a resource block in a slot. In one aspect, if the configuration information indicates that the UE may transmit the SRS on comb-5 SRS transmission or other comb-N SRS transmissions greater than comb-4, the UE may generate a second set of SRS on one of every 5 resource elements or one of every resource elements of values greater than 4 over a span of one or more resource blocks in a slot. In one aspect, if the configuration information indicates that the UE may receive CSI-RS on one of every N resource elements over a span of one or more resource blocks where N is 25 or other values greater than 24, the UE may configure itself to receive the CSI-RS on one of every 25 resource elements or one of every resource elements of values greater than 24 over a span of one or more resource blocks in a slot.

At 910, the UE may transmit a first set of SRS on one of every M resource elements over an integer number of resource blocks in a slot to the TRPs. For example, first set of SRS transmission component 1010 and/or transmission component 1002 may transmit the first set of SRS. For example, the UE may transmit a first set of comb-1 SRS transmission over a span of one or more resource blocks in a slot for the TRPs to estimate the downlink channel for downlink transmission precoding.

At 912, the UE may transmit a second set of SRS on one of every J resource elements over a number of resource blocks in a slot to the TRPs. For example, second set of SRS transmission component 1012 and/or transmission component 1002 may transmit the second set of SRS. J may be larger than M of 910 so that the density of SRS resources for the second set of SRS may be less than the density of SRS resources for the first set of SRS. For example, the UE may transmit a second set of comb-5 SRS transmission over a span of one or more resource blocks in a slot for the TRPs to estimate the downlink channel for cluster management and scheduling.

At 914, the UE may receive a set of CSI-RS on one of every N resource elements over a number of resource blocks in a slot from the TRPs, where N is greater than 24. For example, CSI-RS component 1014 and/or reception component 1006 may receive the CSI-RS based on the configuration information received from the base station. For example, the UE may receive a set of CSI-RS on one of every 25 resource elements over a span of one or more resource blocks in a slot from the TRPs. The UE may measure the CSI-RS resources and may transmit the measured CSI-RS resources to the TRPs for the TRPs to estimate the downlink channel for cluster management and scheduling. In another example, the UE may receive the CSI-RS over a span of K resource blocks during a slot, wherein K is less than 2. The UE may receive the CSI-RS on one of every M resource elements over a span of J resource blocks during a slot, wherein M is greater than or equal to N. Communicating with the subset of the plurality of TRPs may comprise receiving, from one of the plurality of TRPs, the CSI-RS on one of every said M resource elements over the span of J resource blocks during a first slot.

Figure 10:
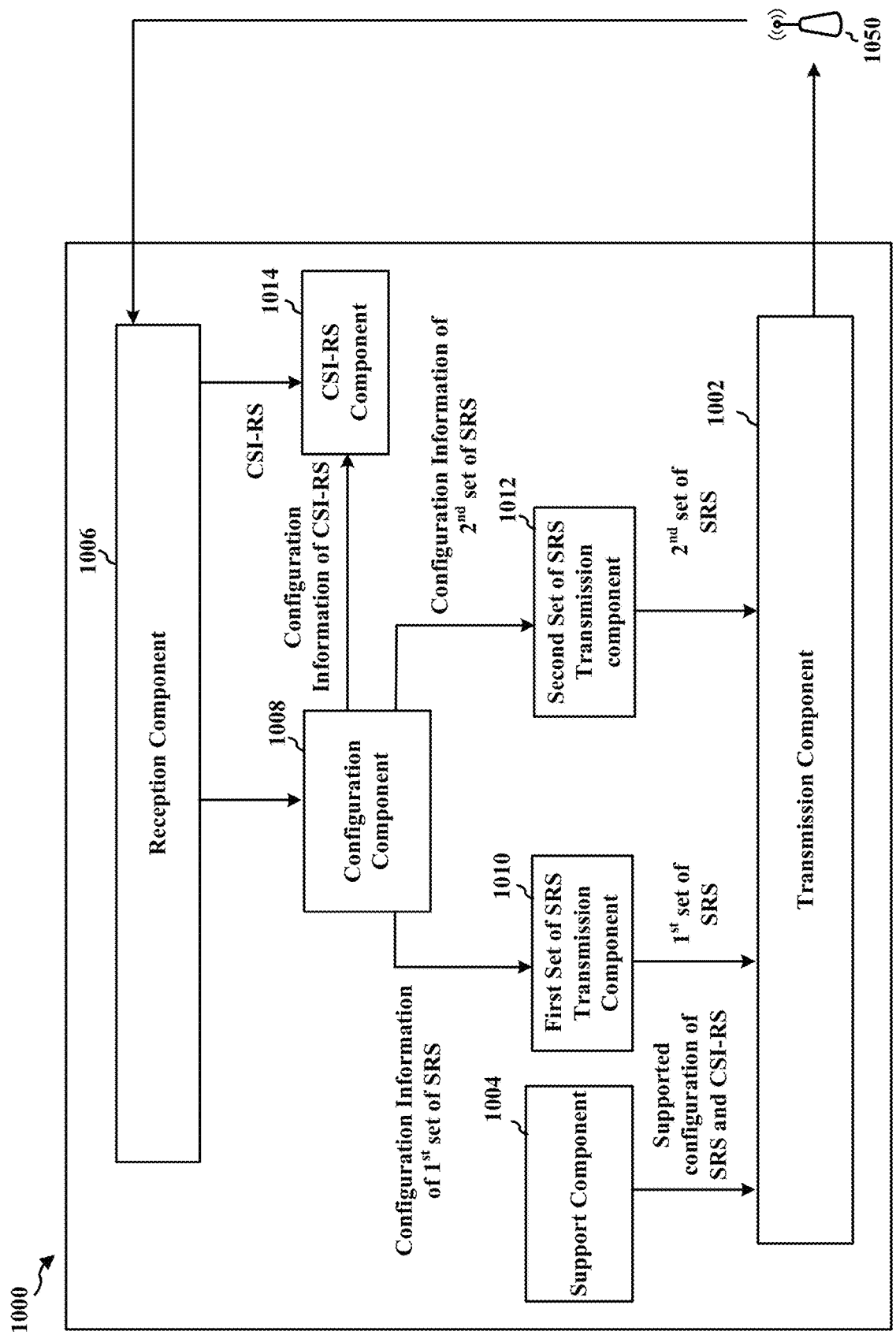
FIG. 10 is a conceptual data flow diagram illustrating the data flow between different modules/means/components in an exemplary apparatus of a UE in accordance with certain aspects of the disclosure.

FIG. 10 is a conceptual data flow diagram illustrating the data flow between different modules/means/components in an exemplary apparatus 1000 of a UE in accordance with certain aspects of the disclosure. The apparatus 1000 may be the UE of 104, 350, 504, 602, or the apparatus 1000' to support CoMP. The apparatus 1000 may include a transmission component 1002, a support component 1004, a reception component 1006, a configuration component 1008, a first set of SRS transmission component 1010, a second set of SRS transmission component 1012, and a CSI-RS component 1014.

The support component 1004 may be configured to generate the apparatus's supported configuration for uplink SRS transmission and its supported configuration for downlink CSI-RS reception to one or more TRPs. The supported configuration may include transmitting the SRS on every resource element (e.g., comb-1 SRS transmission), transmitting the SRS over a span of an integer number of resource blocks in a slot with a granularity of one resource block, transmitting the SRS on every resource element over a span of less than 4 resource blocks (e.g., 1, 2, or 3 resource blocks) in a slot, transmitting the SRS on one of every N resource elements over a span of a number of resource blocks in a slot, where N is greater than 4, etc. The supported configuration may include receiving the CSI-RS on one of every N resource elements over a span of a number of resource blocks in a slot, where N is greater than 24, receiving the CSI-RS over a span of K resource blocks in a slot, where K is less than 2, etc.

The transmission component 1002 may be configured to transmit the supported configuration of the SRS and CSI-RS generated by the supported configuration of SRS and CSI-RS component 1014 to the base station 1050. The base station 1050 may correspond to, e.g., the base station 102, 180, 310, 604, 1300, or the apparatus 1300'.

The configuration component 1008 may be configured to receive the configuration information for one or more SRS transmissions from the apparatus 1000 to the base station 1050 or configuration information for one or more receptions by the apparatus 1000 of CSI-RS transmitted from the base station 1050 based on the supported configuration of the UE. The configuration information may be received through the reception component 1006. The supported configuration of the UE may set the upper bounds of the configuration information generated for the UE. The configuration information may indicate to the apparatus 1000 to transmit the SRS on every resource element over a span of 1 resource block in a slot. In another aspect, the configuration information may indicate to the apparatus 1000 to transmit the SRS on one of every 5 resource elements over a span of two resource blocks in a slot. In one aspect, the configuration information may indicate to the apparatus 1000 to receive CSI-RS on one of every 25 resource elements over a span of 1 resource blocks in a slot from the base station 1050.

The configuration information may be used by the first set of SRS transmission component 1010 to generate a first set of SRS transmission. In one aspect, first set of SRS transmission component 1010 may be configured to generate a first set of SRS on every resource element of a resource block in a slot.

The configuration information may be used by the second set of SRS transmission component 1012 to generate the second set of SRS transmission. In one aspect, the second set of SRS transmission component 1012 may be configured to generate a second set of SRS one of every 5 resource elements or one of every resource elements of values greater than 4 over a span of one or more resource blocks in a slot. The first set of SRS transmission and the second set of SRS transmission may be sent to the transmission component for transmission to the base station 1050.

The configuration information may be used by the CSI-RS component 1014 to receive the set of CSI-RS resources received from the base station 1050 through the reception component 1006. The CSI-RS component 1014 may be configured to receive the CSI-RS on one of every 25 resource elements or one of every resource elements of values greater than 24 over a span of one or more resource blocks in a slot.

Figure 11:
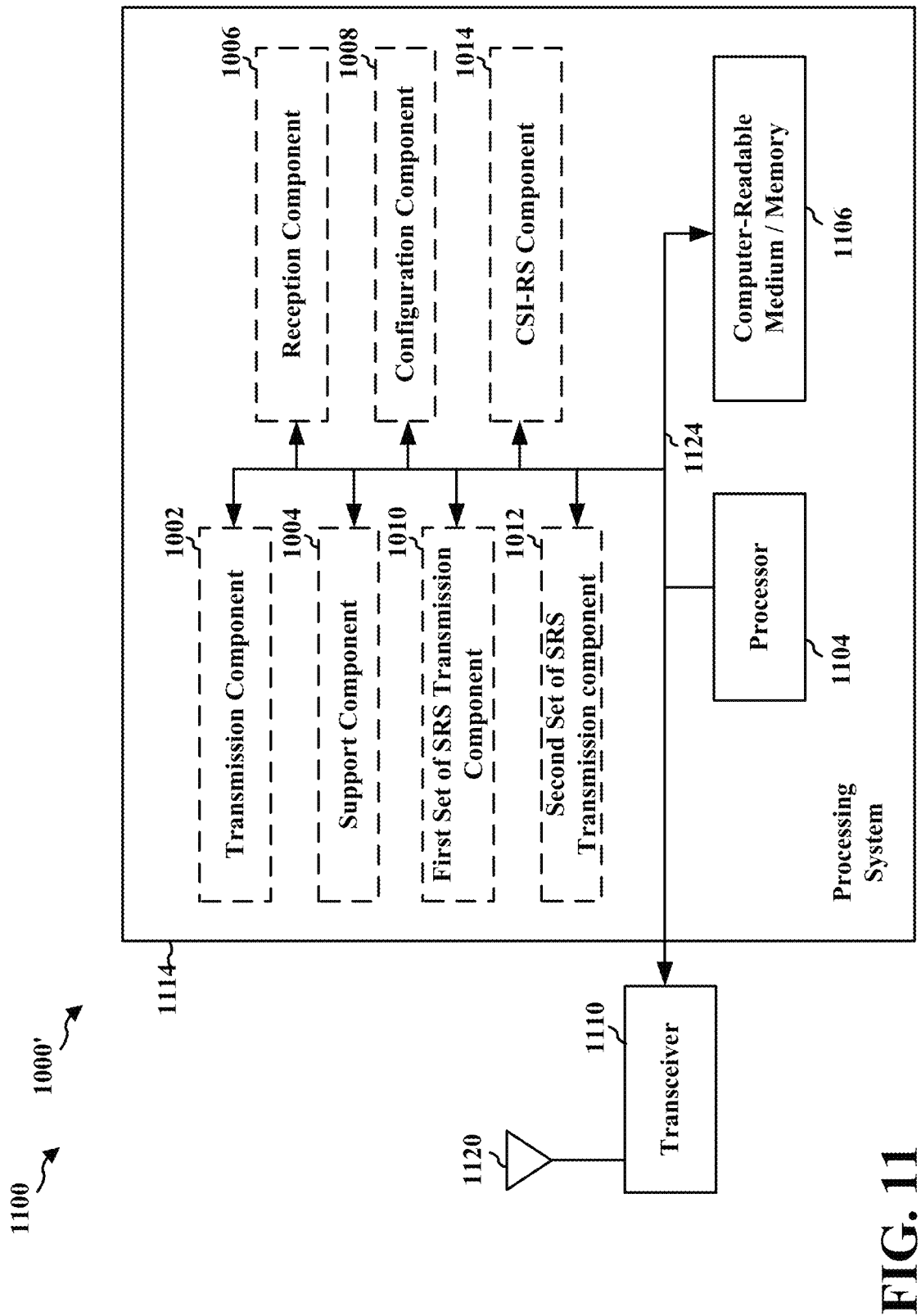
FIG. 11 is a diagram illustrating an example of a hardware implementation for an apparatus of a UE employing a processing system in accordance with certain aspects of the disclosure.

FIG. 11 is a diagram illustrating an example of a hardware implementation for an apparatus 1000' of a UE employing a processing system 1114 in accordance with certain aspects of the disclosure. The processing system 1114 may be implemented with a bus architecture, represented generally by the bus 1108. The bus 1108 may include any number of interconnecting buses and bridges depending on the specific application of the processing system 1114 and the overall design constraints. The bus 1108 links together various circuits including one or more processors and/or hardware components, represented by the processor 1104, the components 1010, 1012, 1014, 1016, 1018, and the computer-readable medium/memory 1106. The bus 1108 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information such as the configuration information of the SRS and CSI-RS, or the CSI-RS from the received signal transmitted by the base station, and provides the extracted information to the processing system 1114, specifically the reception component 1006, the configuration information of SRS and configuration component 1008, and the CSI-RS component 1014. In addition, the transceiver 1110 receives information from the processing system 114, specifically the supported configuration of SRS and CSI-RS, the first set of SRS transmission, or the second set of SRS transmission, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system further includes at least one of the components 1002, 1004, 1006, 1008, 1010, 1012, and 1014. The components may be software components running in the processor 1104 configured to perform the stated processes/algorithm, resident/stored in the computer readable medium/memory 1106 for implementation by the processor 1104, one or more hardware components specifically configured to carry out the stated processes/algorithm, one or more hardware components coupled to the processor 1104, or some combination thereof. Alternatively, the processing system 1114 may be the entire UE (e.g., see 350 of FIG. 3).

In one configuration, the apparatus 1000' may include means for generating the supported configuration of SRS and CSI-RS by the apparatus 1000'. The means for generating the supported configuration of SRS and CSI-RS may be implemented by the supported configuration of SRS and CSI-RS component 1014. The apparatus 1000' may include means for receiving the configuration information of SRS and CSI-RS from a base station. The means for receiving the configuration information of SRS and CSI-RS from a base station may be implemented by the configuration information of SRS and CSI-RS component 1014. The apparatus 1000' may include means for generating the first set of SRS and means for generating the second set of SRS based on the configuration information for the SRS. The means for generating the first set of SRS may be implemented by the first set of SRS transmission component 1010. The means for generating the second set of SRS may be implemented by the second set of SRS transmission component 1012. The apparatus 1000' may include means for receiving CSI-RS from the base station based on the configuration information for the CSI-RS. The means for receiving the CSI-RS from the base station may be implemented by the CSI-RS component 1014.

Figure 12:
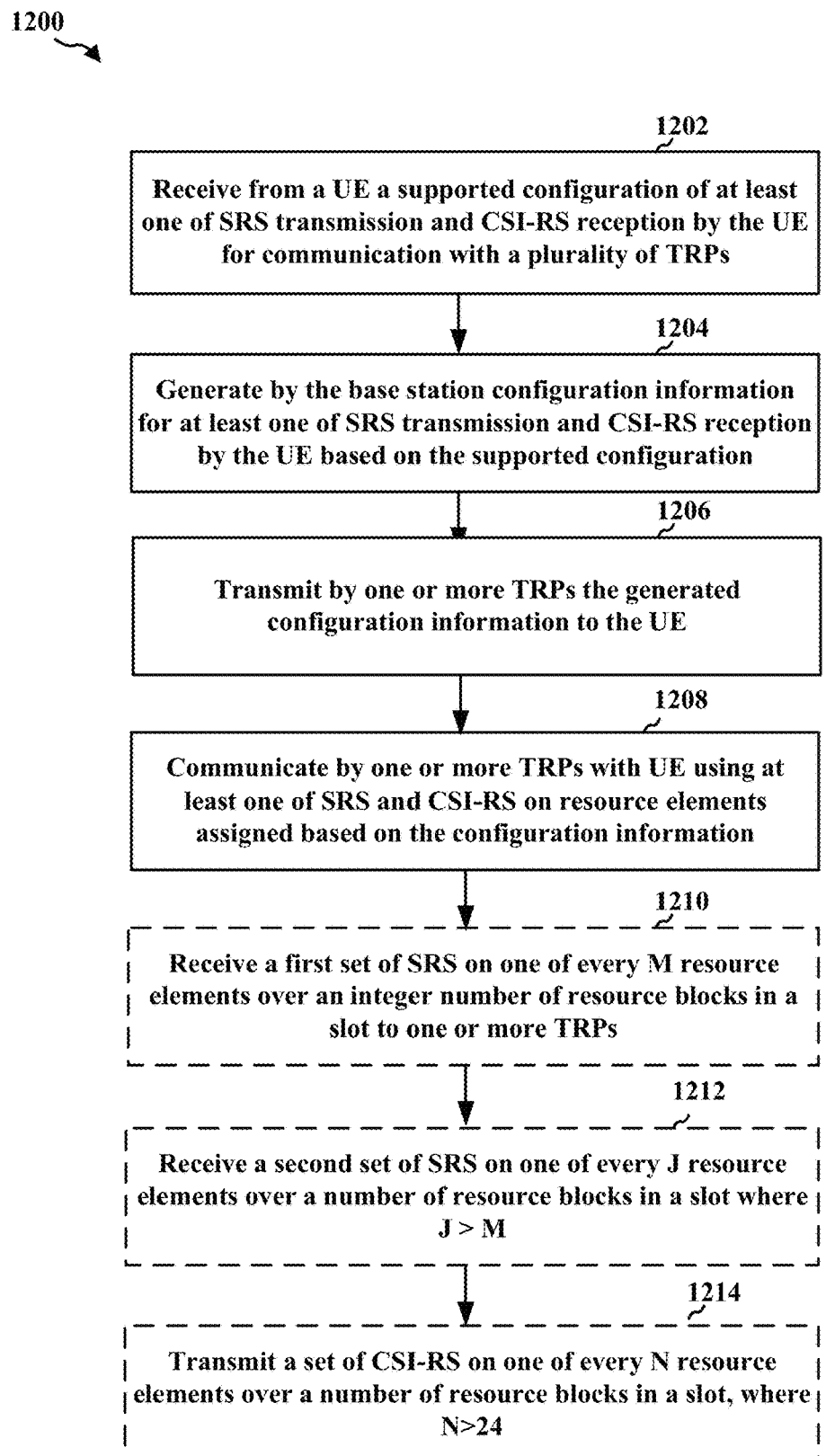
FIG. 12 is a flowchart of a method of wireless communication that may be implemented by a base station in accordance with certain aspects of the disclosure.

FIG. 12 is a flowchart 1200 of a method of wireless communication that may be implemented by a base station in accordance with certain aspects of the disclosure. The method may be performed by the TRP or base station or a component of a base station (e.g., base station 102, 180, 310, 604, apparatus 1300, 1300' the processing system 1414, which may include the memory 376 and which may be the entire base station 310 or a component of the base station 310, such as the TX processor 316, the RX processor 370, and/or the controller/processor 375). Optional aspects are illustrated with a dashed line. The method may help the base station/TRP to receive SRS and/or transmit CSI-RS in a more efficient manner that supports the unique needs of cluster management and scheduling in CoMP and/or pre-coding for downlink transmissions in CoMP.

At 1202, the base station may receive, e.g., via one or more TRPs connected to the base station, a supported configuration for uplink SRS transmission and/or the supported configuration for downlink CSI-RS reception by a UE. The reception may be performed by support component 1306 and/or reception component 1304 in apparatus 1300. In one aspect, the base station may receive an indication that UE supports transmitting the SRS on every resource element (e.g., comb-1 SRS transmission). In one aspect, the base station may receive an indication that the UE supports transmitting the SRS over a span of an integer number of resource blocks in a slot with a granularity of one resource block. In one aspect, the base station may receive an indication that the UE supports transmitting the SRS on every resource element over a span of less than 4 resource blocks (e.g., 1, 2, or 3 resource blocks) in a slot. In one aspect, to reduce the density of SRS transmission for cluster management and scheduling, the base station may receive an indication that the UE supports transmitting the SRS on one of every N resource elements over a span of a number of resource blocks in a slot, where N is greater than 4.

In one aspect, to reduce the density of CSI-RS transmission by the TRPs, the base station may receive an indication that the UE supports receiving the CSI-RS on one of every N resource elements over a span of a number of resource blocks in a slot, where N is greater than 24. In one aspect, the base station may receive an indication that the UE supports receiving the CSI-RS over a span of less than 2 resource blocks in a slot. In one aspect, the base station may receive an indication that the UE supports receiving more than a threshold number of CSI-RS resources from a number of TRPs connected with the base station during a slot. In one aspect, the threshold number of CSI-RS resources received in a slot includes a threshold number of non-zero power (NZP) CSI-RS resources received in a component carrier during a slot, where the threshold number of NZP CSI-RS resources is greater than 32.

At 1204, the base station may generate configuration information for one or more SRS transmissions from the UE to the base station or configuration information for one or more receptions by the UE of CSI-RS transmitted from the base station based on the supported configuration of the UE. For example, configuration component 1308 of apparatus 1300 may generate the configuration information. The supported configuration of the UE may set the upper bounds of the configuration information generated for the UE. In one aspect, the configuration information may indicate to the UE to transmit the SRS on every resource element over a span of 1 resource block in a slot. In another example, the configuration information may indicate to the UE to transmit the SRS on one of every 5 resource elements over a span of two resource blocks in a slot. In one aspect, the configuration information may indicate to the UE to receive CSI-RS on one of every 25 resource elements over a span of 1 resource blocks in a slot from the TRPs.

At 1206, the base station may transmit through the TRPs the generated configuration information to the UE. For example, the transmission component 1310 may transmit the configuration information. The subset of the TRPs that receive the supported configuration for the SRS transmission and the supported configuration for the CSI-RS reception by the UE may be different from the subset of the TRPs that transmit the generated configuration information to the UE.

At 1208, the base station may communicate with the UE by receiving the SRS or transmitting the CSI-RS on resource elements assigned based on the configuration information through a subset of the TRPs. The subset of TRPs receiving the SRS or transmitting the CSI-RS may be different from the subset of the TRPs that receive the supported configuration for the SRS transmission and the supported configuration for the CSI-RS reception from the UE, or the subset of the TRPs that transmit the generated configuration information to the UE.

The supported configuration may comprise an SRS comb density supported by the UE, and communicating with at least the subset of the plurality of TRPs may include receiving the SRS transmission on resource elements assigned by the base station based on the comb density supported by the UE. The SRS may comprise a cyclic shift based on a number of the resource elements assigned for the SRS transmission, and a number of cyclic shifts in a set of cyclic shifts for a sequence for the SRS may be based on a value of the comb density for the SRS or a number of resource elements assigned for the SRS.

Based on the configuration information, the base station may receive one or more SRS transmissions from the UE or may transmit the CSI-RS to the UE. In one aspect, if the configuration information indicates that the UE may transmit the SRS on every resource element over a span of 1 resource block, the base station may receive a first set of SRS on every resource element of a resource block in a slot. In one aspect, if the configuration information indicates that the UE may transmit the SRS on comb-5 SRS transmission or other comb-N SRS transmissions greater than comb-4, the base station may receive a second set of SRS on one of every 5 resource elements or one of every resource elements of values greater than 4 over a span of one or more resource blocks in a slot. In one aspect, if the configuration information indicates that the UE may receive CSI-RS on one of every N resource elements over a span of one or more resource blocks where N is 25 or other values greater than 24, the base station may transmit the CSI-RS on one of every 25 resource elements or one of every resource elements of values greater than 24 over a span of one or more resource blocks in a slot.

At 1210, the base station may receive a first set of SRS on one of every M resource elements over an integer number of resource blocks in a slot. For example, first SRS component 1312 of apparatus 1300 may receive the first set of SRS. For example, the base station may receive a first set of comb-1 SRS transmission over a span of one or more resource blocks in a slot for the base station to estimate the downlink channel for downlink transmission precoding.

At 1212, the base station may receive a second set of SRS on one of every J resource elements over a number of resource blocks in a slot. For example, second SRS component 1314 of apparatus 1300 may receive the second set of SRS. J may be larger than M of 910 so that the density of SRS resources for the second set of SRS may be less than the density of SRS resources for the first set of SRS. For example, the base station may receive a second set of comb-5 SRS transmission over a span of one or more resource blocks in a slot for the base station to estimate the downlink channel for cluster management and scheduling.

At 1214, the base station may transmit a set of CSI-RS on one of every N resource elements over a number of resource blocks in a slot, where N is greater than 24. For example, first CSI-RS component 1316 of apparatus 1300 may transmit the CSI-RS. For example, the base station may transmit a set of CSI-RS on one of every 25 resource elements over a span of one or more resource blocks in a slot. The UE may measure the CSI-RS resources and may transmit the measured CSI-RS resources to the base station for the base station to estimate the downlink channel for cluster management and scheduling.

Figure 13:
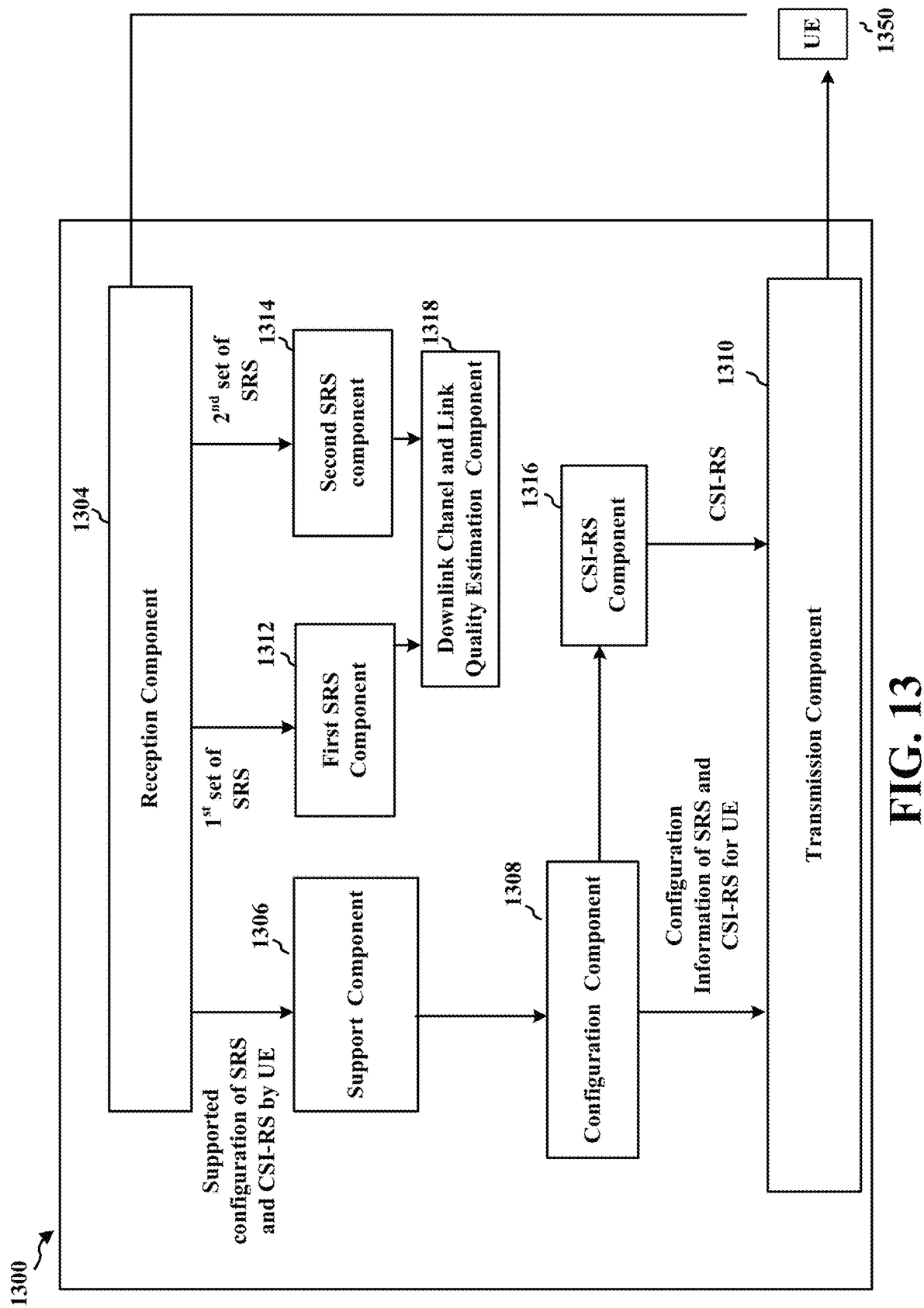
FIG. 13 is a conceptual data flow diagram illustrating the data flow between different modules/means/components in an exemplary apparatus of a base station in accordance with certain aspects of the disclosure.

FIG. 13 is a conceptual data flow diagram illustrating the data flow between different modules/means/components in an exemplary apparatus 1300 that may comprise a base station or a component of a base station in accordance with certain aspects of the disclosure. The apparatus 1300 may be the base station of 102, 180, 310, 604, 1050. The apparatus 1300 may include a reception component 1304, a support component 1306, a configuration component 1308, a transmission component 1310, a first SRS component 1312, a second SRS component 1314, a CSI-RS component 1316, and a downlink channel and link quality estimation component 1318.

The support component 1306 may be configured to receive the apparatus's supported configuration for uplink SRS transmission and its supported configuration for downlink CSI-RS reception through the reception component 1304 from the UE 1350. The supported configuration may include transmitting the SRS on every resource element (e.g., comb-1 SRS transmission), transmitting the SRS over a span of an integer number of resource blocks in a slot with a granularity of one resource block, transmitting the SRS on every resource element over a span of less than 4 resource blocks (e.g., 1, 2, or 3 resource blocks) in a slot, transmitting the SRS on one of every N resource elements over a span of a number of resource blocks in a slot, where N is greater than 4, etc.

The configuration component 1308 may be configured to generate the configuration information for one or more SRS transmissions from UE to the apparatus 1300 or configuration information for one or more transmissions of CSI-RS from the base station to the UE 1350 based on the supported configuration of the UE 1350. The configuration information may be transmitted through the transmission component 1310. The supported configuration of the UE may set the upper bounds of the configuration information generated for the UE. The configuration information may indicate to the UE 1350 to transmit the SRS on every resource element over a span of 1 resource block in a slot. In another aspect, the configuration information may indicate to the UE 1350 to transmit the SRS on one of every 5 resource elements over a span of two resource blocks in a slot. In one aspect, the configuration information may indicate to the UE 1350 to receive CSI-RS on one of every 25 resource elements over a span of 1 resource blocks in a slot from the base station 1050.

The configuration information may be used by the first SRS component 1312 to receive a first set of SRS transmission from the UE 1350. In one aspect, first SRS component 1312 may be configured to receive a first set of SRS on every resource element of a resource block in a slot.

The configuration information may be used by the second SRS component 1314 to receive the second set of SRS transmission from the UE 1350. In one aspect, the second SRS component 1314 may be configured to receive a second set of SRS one of every 5 resource elements or one of every resource elements of values greater than 4 over a span of one or more resource blocks in a slot. The first set of SRS transmission and the second set of SRS transmission may be received from the reception component 1304.

The configuration information may be used by the CSI-RS component 1316 to transmit the set of CSI-RS resources to the UE 1350 through the transmission component 1310. The CSI-RS component 1316 may be configured to transmit the CSI-RS on one of every 25 resource elements or one of every resource elements of values greater than 24 over a span of one or more resource blocks in a slot.

The downlink channel and link quality estimation component 1318 may be configured to estimate one or more downlink channels with the UE 1350 based on the first set of SRS to determine precoding for downlink transmission. The downlink channel and link quality estimation component 1318 may also be configured to estimate a link quality of one or more uplink channels or one or more downlink channels with the UE 1350 based on one or more of the first set of SRS, the second set of SRS, or measurements of the CSI-RS by the UE 1350 transmitted from the UE 1350 to the base station, e.g., apparatus 1300.

Figure 14:
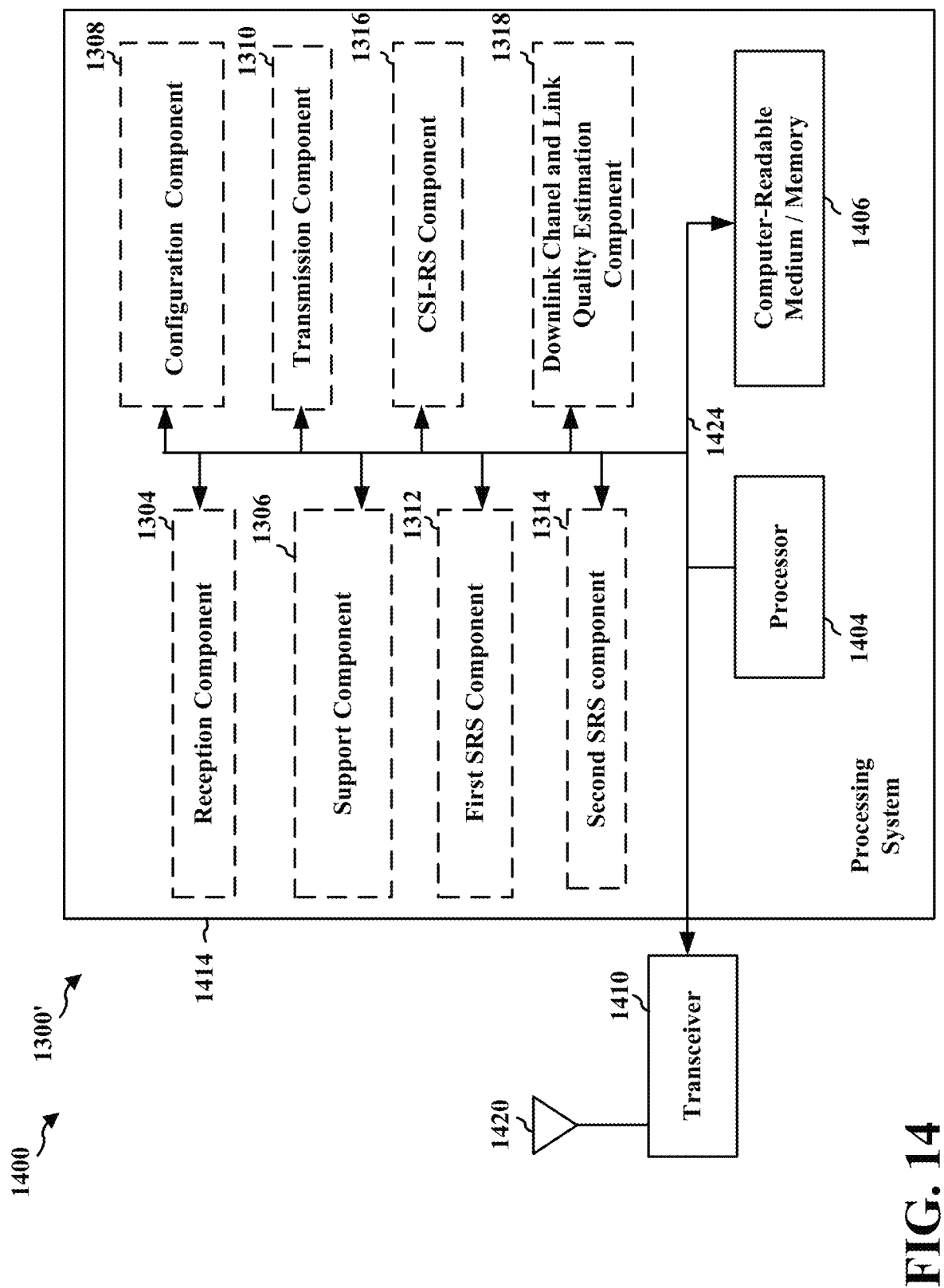
FIG. 14 is a diagram illustrating an example of a hardware implementation for an apparatus of a base station employing a processing system in accordance with certain aspects of the disclosure.

FIG. 14 is a diagram illustrating an example of a hardware implementation for an apparatus 1300' of a base station employing a processing system 1414 in accordance with certain aspects of the disclosure. The processing system 1414 may be implemented with a bus architecture, represented generally by the bus 1408. The bus 1408 may include any number of interconnecting buses and bridges depending on the specific application of the processing system 1414 and the overall design constraints. The bus 1408 links together various circuits including one or more processors and/or hardware components, represented by the processor 1404, the components 1410, 1412, 1414, 1416, 1418, and the computer-readable medium/memory 1406. The bus 1408 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The transceiver 1410 receives a signal from the one or more antennas 1120, extracts information such as the supported configuration information of the SRS and CSI-RS, or the SRS from the received signal transmitted by the UE and provides the extracted information to the processing system 1114, specifically the reception component 1304, the supported configuration of SRS and CSI-RS by support component 1306, the first set of SRS component 1312, and the second SRS component 1314. In addition, the transceiver 1110 receives information from the processing system 114, specifically the configuration information of SRS and CSI-RS, the CSI-RS transmission, and based on the received information, generates a signal to be applied to the one or more antennas 1420. The processing system 1414 includes a processor 1404 coupled to a computer-readable medium/memory 1406. The processor 1404 is responsible for general processing, including the execution of software stored on the computer-readable medium/memory 1406. The software, when executed by the processor 1404, causes the processing system 1414 to perform the various functions described supra for any particular apparatus. The computer-readable medium/memory 1406 may also be used for storing data that is manipulated by the processor 1404 when executing software. The processing system further includes at least one of the components 1404, 1406, 1408, 1410, 1412, 1414, 1416, and 1418. The components may be software components running in the processor 1104 configured to perform the stated processes/algorithm, resident/stored in the computer readable medium/memory 1406 for implementation by the processor 1404, one or more hardware components specifically configured to carry out the stated processes/algorithm, one or more hardware components coupled to the processor 1404, or some combination thereof. Alternatively, the processing system 1414 may be the entire base station (e.g., see 310 of FIG. 3).

In one configuration, the apparatus 1300' may include means for receiving the supported configuration of SRS and CSI-RS by the UE. The means for receiving the supported configuration of SRS and CSI-RS by the UE may be implemented by the configuration information of SRS and CSI-RS by support component 1306. The apparatus 1300' may include means for generating the configuration information of SRS and CSI-RS. The means for generating the configuration information of SRS and CSI-RS may be implemented by the configuration information of SRS and CSI-RS for configuration component 1308. The apparatus 1300' may include means for receiving the first set of SRS and means for receiving the second set of SRS based on the configuration information for the SRS. The means for receiving the first set of SRS may be implemented by the first SRS component 1312. The means for receiving the second set of SRS may be implemented by the second SRS component 1314. The apparatus 1300' may include means for transmitting CSI-RS based on the configuration information for the CSI-RS. The means for transmitting the CSI-RS from the base station may be implemented by the CSI-RS component 1314. The apparatus 1300' may include means for estimating one or more downlink channels using the first set of SRS or means for estimating a link quality of one or more uplink channels or one or more downlink channels based on one or more of the first set of SRS, the second set of SRS, or measurements of the CSI-RS received by the apparatus 1300'. The means for estimating the downlink channels or means for estimating a link quality of the uplink or downlink channels may be implemented by the downlink channel and link quality estimation component 1318.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication by a user equipment (UE), comprising:
   transmitting a supported configuration of the UE for sounding reference signal (SRS) transmission with one or more transmission reception points (TRPs);
   receiving configuration information for the SRS transmission, wherein the configuration information is based on the supported configuration; and
   communicating with the one or more TRPs, using the SRS transmission on resource elements assigned based on the configuration information,
   wherein the supported configuration by the UE of the SRS transmission comprises information indicating the UE supports one or more of transmitting the SRS transmission over a first span of an integer number of resource blocks during a slot, transmitting the SRS transmission using every resource element over a second span of one or more resource blocks during the slot, or transmitting the SRS transmission using one of every N resource elements over a third span of one or more resource blocks during the slot, wherein N is greater than 4.

2. The method of claim 1, wherein the supported configuration comprises an SRS comb density supported by the UE, and wherein communicating with the one or more TRPs includes transmitting the SRS transmission on the resource elements, which are assigned based on the SRS comb density supported by the UE.

3. The method of claim 2, wherein the SRS transmission is based on a cyclic shift that is based on a number of the resource elements assigned for the SRS transmission.

4. The method of claim 1, wherein a number of cyclic shifts in a set of cyclic shifts for a sequence for the SRS transmission is based on a value of a comb density for the SRS transmission or a number of the resource elements assigned for the SRS transmission.

5. The method of claim 1, wherein the configuration information is received from at least one of the one or more TRPs in one or more of a radio resource control (RRC) message, a medium access control (MAC) control element (CE), a non-access stratum (NAS) message, or a downlink control information (DCI).

6. The method of claim 1, wherein the supported configuration by the UE of the SRS transmission comprises information indicating the UE supports transmitting the SRS transmission using one of every N resource elements over the third span of one or more resource blocks during the slot, wherein N is greater than 4.

7. The method of claim 1, wherein the supported configuration comprises the SRS transmission using every resource element over the second span of the one or more resources blocks during the slot, and the configuration information received by the UE comprises information configuring the UE to transmit a first set of SRS on each resource element over the first span of a first integer number of resource blocks during the slot.

8. The method of claim 7, wherein communicating with the one or more TRPs comprises transmitting the first set of SRS on each resource element over the first span of the first integer number of resource blocks during a first slot.

9. The method of claim 8, wherein the configuration information configures the UE to transmit a second set of the SRS on one of every J resource elements over a fourth span of a second integer number of resource blocks during the slot using a cyclic shift for a sequence associated with the second set of the SRS, wherein J is greater than 1.

10. The method of claim 9, wherein J is greater than four.

11. The method of claim 1, wherein the supported configuration of the UE is for an SRS transmission with a plurality of TRPs.

12. The method of claim 1, wherein a number of cyclic shifts in a set of cyclic shifts for a sequence for the SRS transmission is based on a value of a comb density for the SRS transmission having N being greater than 4.

13. A method of wireless communication by a user equipment (UE), comprising:
transmitting a supported configuration of the UE for channel state information reference signal (CSI-RS) reception with one or more transmission reception points (TRPS), wherein the supported configuration of the UE comprises a CSI-RS density supported by the UE and indicates that the UE supports one or more of receiving the CSI-RS on one of every N resource elements over a first span of one or more resource blocks during a slot, wherein N is greater than 24, or receiving the CSI-RS over a second span of K resource blocks during the slot, wherein K is less than 2;
receiving, in response to transmitting the supported configuration, configuration information for the CSI-RS reception, wherein the configuration information is based on the supported configuration; and
communicating with the one or more TRPs, using the CSI-RS reception on resource elements assigned based on the configuration information.

14. The method of claim 13, wherein the configuration information configures the UE to receive the CSI-RS on one of every M resource elements over a third span of J resource blocks during the slot, wherein M is greater than or equal to N, and wherein communicating with the one or more TRPs comprises receiving, from one of the one or more TRPs, the CSI-RS on one of every said M resource elements over the third span of J resource blocks during a first slot.

15. The method of claim 13, wherein the supported configuration of the UE is for the CSI-RS reception with a plurality of TRPs.

16. A method of wireless communication by a user equipment (UE), comprising:
transmitting a supported configuration of the UE for channel state information reference signal (CSI-RS) reception with one or more transmission reception points (TRPS), wherein the supported configuration by the UE of the CSI-RS reception comprises information indicating the UE supports receiving more than a threshold number of CSI-RS resources during a slot, wherein the threshold number of CSI-RS resources during the slot comprises a threshold number of non-zero power (NZP) CSI-RS resources received in a component carrier during the slot, wherein the threshold number of NZP CSI-RS resources is greater than 32;
receiving, in response to transmitting the supported configuration, configuration information for the CSI-RS reception, wherein the configuration information is based on the supported configuration; and
communicating with the one or more TRPs, using the CSI-RS reception on resource elements assigned based on the configuration information.

17. The method of claim 16, wherein the supported configuration of the UE is for the CSI-RS reception with a plurality of TRPs.

18. A method of wireless communication by a base station, comprising:
receiving, from a user equipment (UE), a supported configuration of the UE for sounding reference signals (SRS) transmission with one or more transmission reception points (TRPs);
generating, by the base station, configuration information for the SRS transmission by the UE, wherein the configuration information is based on the supported configuration of the UE;
transmitting the configuration information to the UE; and
communicating, through at least a subset of the one or more TRPs with the UE, including SRS reception from the UE on resource elements assigned based on the configuration information,
wherein the supported configuration by the UE of the SRS transmission comprises information indicating the UE supports one or more of transmitting the SRS transmission over a first span of an integer number of resource blocks during a slot, transmitting the SRS transmission using every resource element over a second span of one or more resource blocks during the slot, or transmitting the SRS transmission using one of every N resource elements over a third span of one or more resource blocks during the slot, wherein N is greater than 4.

19. The method of claim 18, wherein the supported configuration comprises an SRS comb density supported by the UE, and wherein communicating with at least the subset of the one or more TRPs includes receiving the SRS transmission on the resource elements assigned by the base station based on the SRS comb density supported by the UE.

20. The method of claim 18, wherein the SRS transmission is based on a cyclic shift that is based on a number of the resource elements assigned for the SRS transmission.

21. The method of claim 18, wherein a number of cyclic shifts in a set of cyclic shifts for a sequence for the SRS transmission is based on a value of a comb density for the SRS transmission or a number of the resource elements assigned for the SRS transmission.

22. The method of claim 18, wherein the configuration information is generated by the base station and is transmitted to the UE in one or more of a radio resource control (RRC) message, a medium access control (MAC) control element (CE), a non-access stratum (NAS) message, or a downlink control information (DCI).

23. The method of claim 18, wherein the supported configuration by the UE of the SRS transmission comprises information indicating the UE supports transmitting the SRS transmission using one of every N resource elements over the third span of one or more resource blocks during the slot, wherein N is greater than 4.

24. The method of claim 18, wherein the supported configuration comprises the SRS transmission using every resource element over the second span of the one or more resources blocks during the slot, and the configuration information is generated by the base station and comprises information configuring the UE to transmit a first set of SRS on one of every M resource elements over the first span of the first integer number of resource blocks during the slot, wherein M is greater than or equal to 1.

25. The method of claim 24, wherein communicating with the UE comprises receiving from the UE, the first set of the SRS on one of every said M resource elements over the first span of the first integer number of resource blocks during a first slot, the method further comprising:
estimating, by the base station, one or more downlink channels with the UE based on the first set of the SRS for determining precoding for one or more downlink transmissions; and
transmitting the one or more downlink transmissions to the UE.

26. The method of claim 24, wherein the configuration information comprises information configuring the UE to transmit a second set of the SRS on one of every J resource elements over a fourth span of a second integer number of resource blocks during the slot using a cyclic shift for a sequence associated with the second set of the SRS, wherein J is greater than M, and wherein the cyclic shift is determined in part based on a number of subcarriers in a symbol used to transmit the second set of SRS, and wherein communicating with the UE comprises receiving, from the UE, the second set of the SRS on one of every said J resource elements over the fourth span of the second integer number of resource blocks during a second slot using the cyclic shift for the sequence.

27. The method of claim 26, further comprising:
obtaining by the base station a link quality estimate of one or more uplink channels or one or more downlink channels with the UE based on the first set of the SRS and the second set of the SRS for a coordinated multipoint communication (CoMP) with the UE.

28. The method of claim 18, wherein the supported configuration is for an SRS transmission with a plurality of TRPs.

29. The method of claim 18, wherein a number of cyclic shifts in a set of cyclic shifts for a sequence for the SRS transmission is based on a value of a comb density for the SRS transmission having N being greater than 4.

30. A method of wireless communication by a base station, comprising:
receiving, from a user equipment (UE), a supported configuration of the UE for channel state information reference signals (CSI-RS) reception with one or more transmission reception points (TRPs), wherein the supported configuration by the UE of the CSI-RS reception comprises information indicating the UE supports one or more of receiving the CSI-RS on one of every N resource elements over a first span of one or more resource blocks during a slot, wherein N is greater than 24, or receiving the CSI-RS over a second span of K resource blocks during the slot, wherein K is less than 2;
generating, by the base station, configuration information for the CSI-RS reception by the UE, wherein the configuration information is based on the supported configuration of the UE;
transmitting the configuration information to the UE; and
communicating, through the one or more TRPs with the UE, including CSI-RS transmission to the UE on resource elements assigned based on the configuration information.

31. The method of claim 30, wherein the configuration information is generated by the base station and comprises information configuring the UE to receive the CSI-RS on one of every M resource elements over a third span of J resource blocks during a slot, wherein M is greater than or equal to N, and wherein communicating with the UE comprises transmitting the CSI-RS on one of every said M resource elements over the third span of J resource blocks during a first slot.

32. The method of claim 30, wherein the supported configuration is for the CSI-RS reception with a plurality of TRPs.

33. A method of wireless communication by a base station, comprising:
receiving, from a user equipment (UE), a supported configuration of the UE for channel state information reference signals (CSI-RS) reception with one or more transmission reception points (TRPs), wherein the supported configuration by the UE of the CSI-RS reception comprises information indicating the UE supports receiving more than a threshold number of CSI-RS resources during a slot, and wherein the threshold number of CSI-RS resources during the slot comprises a threshold number of non-zero power (NZP) CSI-RS resources received in a component carrier during the slot, wherein the threshold number of NZP CSI-RS resources is greater than 32;
generating, by the base station, configuration information for the CSI-RS reception by the UE, wherein the configuration information is based on the supported configuration of the UE;
transmitting the configuration information to the UE; and communicating, through the one or more TRPs with the UE, including CSI-RS transmission to the UE on resource elements assigned based on the configuration information.

34. The method of claim 33, wherein the supported configuration is for the CSI-RS reception with a plurality of TRPs.

35. An apparatus for wireless communication at a user equipment (UE), comprising:
a memory; and
at least one processor coupled to the memory and configured to:
transmit a supported configuration of the UE for sounding reference signal (SRS) transmission with one or more transmission reception points (TRPs);
receive configuration information for the SRS transmission, wherein the configuration information is based on the supported configuration; and
communicate with the one or more TRPs, using the SRS transmission on resource elements assigned based on the configuration information,
wherein the supported configuration by the UE of the SRS transmission comprises information indicating the UE supports one or more of transmitting the SRS transmission over a first span of an integer number of resource blocks during a slot, transmitting the SRS transmission using every resource element over a second span of one or more resource blocks during the slot, or transmitting the SRS transmission using one of every N resource elements over a third span of one or more resource blocks during the slot, wherein N is greater than 4.

36. The apparatus of claim 35, wherein the supported configuration comprises an SRS comb density supported by the UE,
wherein communicating with the one or more TRPs includes transmitting the SRS transmission on the resource elements assigned based on the SRS comb density supported by the UE,
wherein the SRS transmission is based on a cyclic shift that is based on a number of the resource elements assigned for the SRS transmission, and wherein a number of cyclic shifts in a set of cyclic shifts for a sequence for the SRS transmission is based on a value of the SRS comb density for the SRS transmission or a number of resource elements assigned for the SRS transmission.

37. The apparatus of claim 35, wherein the supported configuration comprises an SRS comb density supported by the UE, and wherein communication with the one or more TRPs includes the SRS transmission on the resource elements, which are assigned based on the SRS comb density supported by the UE.

38. The apparatus of claim 35, wherein the supported configuration by the UE of the SRS transmission comprises information indicating the UE supports transmitting the SRS transmission using one of every N resource elements over the third span of one or more resource blocks during the slot, wherein N is greater than 4.

39. The apparatus of claim 35, wherein the supported configuration of the UE is for an SRS transmission with a plurality of TRPs.

40. The apparatus of claim 35, wherein a number of cyclic shifts in a set of cyclic shifts for a sequence for the SRS transmission is based on a value of a comb density for the SRS transmission having N being greater than 4.

41. An apparatus for wireless communication at a base station, comprising:
a memory; and
at least one processor coupled to the memory and configured to:
receive, from a user equipment (UE), a supported configuration of the UE for sounding reference signals (SRS) transmission with one or more transmission reception points (TRPs);
generate, by the base station, configuration information for the SRS transmission by the UE, wherein the configuration information is based on the supported configuration of the UE;
transmit the configuration information to the UE; and
communicate, through at least a subset of the one or more TRPs with the UE, including SRS reception from the UE on resource elements assigned based on the configuration information,
wherein the supported configuration by the UE of the SRS transmission comprises information indicating the UE supports one or more of transmitting the SRS transmission over a first span of an integer number of resource blocks during a slot, transmitting the SRS transmission using every resource element over a second span of one or more resource blocks during the slot, or transmitting the SRS transmission using one of every N resource elements over a third span of one or more resource blocks during the slot, wherein N is greater than 4.

42. The apparatus of claim 41, wherein the supported configuration comprises an SRS comb density supported by the UE, and wherein communicating with at least the subset of the one or more TRPs includes receiving the SRS transmission on the resource elements assigned by the base station based on the SRS comb density supported by the UE,
wherein the SRS transmission is based on a cyclic shift that is based on a number of the resource elements assigned for the SRS transmission, and
wherein a number of cyclic shifts in a set of cyclic shifts for a sequence for the SRS transmission is based on a value of the SRS comb density or a number of the resource elements assigned for the SRS transmission.

43. The apparatus of claim 41, wherein the supported configuration is for an SRS transmission with a plurality of TRPs.

44. The apparatus of claim 41, wherein a number of cyclic shifts in a set of cyclic shifts for a sequence for the SRS transmission is based on a value of a comb density for the SRS transmission having N being greater than 4.

45. The apparatus of claim 41, wherein the supported configuration comprises an SRS comb density supported by the UE, and wherein communication with the UE includes the SRS reception on the resource elements, which are assigned based on the SRS comb density supported by the UE.

46. The apparatus of claim 41, wherein the supported configuration by the UE of the SRS transmission comprises information indicating the UE supports transmitting the SRS transmission using one of every N resource elements over the third span of one or more resource blocks during the slot, wherein N is greater than 4.

47. An apparatus for wireless communication at a user equipment (UE), comprising:
a memory; and
at least one processor coupled to the memory and configured to:

transmit a supported configuration of the UE for channel state information reference signal (CSI-RS) reception with one or more transmission reception points (TRPs), wherein the supported configuration of the UE comprises a CSI-RS density supported by the UE and indicates that the UE supports one or more of receiving the CSI-RS on one of every N resource elements over a first span of one or more resource blocks during a slot, wherein N is greater than 24, or receiving the CSI-RS over a second span of K resource blocks during the slot, wherein K is less than 2;

receive, in response to transmitting the supported configuration, configuration information for the CSI-RS reception, wherein the configuration information is based on the supported configuration; and communicate with the one or more TRPs, using the CSI-RS reception on resource elements assigned based on the configuration information.

48. The apparatus of claim 47, wherein the supported configuration of the UE is for the CSI-RS reception with a plurality of TRPs.

49. An apparatus for wireless communication at a user equipment (UE), comprising:
a memory; and
at least one processor coupled to the memory and configured to:
transmit a supported configuration of the UE for channel state information reference signal (CSI-RS) reception with one or more transmission reception points (TRPs), wherein the supported configuration by the UE of the CSI-RS reception comprises information indicating the UE supports receiving more than a threshold number of CSI-RS resources during a slot, wherein the threshold number of CSI-RS resources during the slot comprises a threshold number of non-zero power (NZP) CSI-RS resources received in a component carrier during the slot, wherein the threshold number of NZP CSI-RS resources is greater than 32;

receive, in response to transmitting the supported configuration, configuration information for the CSI-RS reception, wherein the configuration information is based on the supported configuration; and communicate with the one or more TRPs, using the CSI-RS reception on resource elements assigned based on the configuration information.

50. The apparatus of claim 49, wherein the supported configuration of the UE is for the CSI-RS reception with a plurality of TRPs.

51. An apparatus for wireless communication at a base station, comprising:
a memory; and
at least one processor coupled to the memory and configured to:
receive, from a user equipment (UE), a supported configuration of the UE for channel state information reference signals (CSI-RS) reception with one or more transmission reception points (TRPs), wherein the supported configuration by the UE of the CSI-RS reception comprises information indicating the UE supports one or more of receiving the CSI-RS on one of every N resource elements over a first span of one or more resource blocks during a slot, wherein N is greater than 24, or receiving the CSI-RS over a second span of K resource blocks during the slot, wherein K is less than 2;

generate, by the base station, configuration information for the CSI-RS reception by the UE, wherein the configuration information is based on the supported configuration of the UE;

transmit the configuration information to the UE; and communicate, through the one or more TRPs with the UE, including CSI-RS transmission to the UE on resource elements assigned based on the configuration information.

52. The apparatus of claim 51, wherein the supported configuration is for the CSI-RS reception with a plurality of TRPs.

53. An apparatus for wireless communication at a base station, comprising:
a memory; and
at least one processor coupled to the memory and configured to:
receive, from a user equipment (UE), a supported configuration of the UE for channel state information reference signals (CSI-RS) reception with one or more transmission reception points (TRPs), wherein the supported configuration by the UE of the CSI-RS reception comprises information indicating the UE supports receiving more than a threshold number of CSI-RS resources during a slot, and wherein the threshold number of CSI-RS resources during the slot comprises a threshold number of non-zero power (NZP) CSI-RS resources received in a component carrier during the slot, wherein the threshold number of NZP CSI-RS resources is greater than 32;

generate, by the base station, configuration information for the CSI-RS reception by the UE, wherein the configuration information is based on the supported configuration of the UE;

transmit the configuration information to the UE; and communicate, through the one or more TRPs with the UE, including CSI-RS transmission to the UE on resource elements assigned based on the configuration information.

54. The apparatus of claim 53, wherein the supported configuration is for the CSI-RS reception with a plurality of TRPs.

* * * * *